US008874348B2

(12) United States Patent
Ohtsuka et al.

(10) Patent No.: US 8,874,348 B2
(45) Date of Patent: Oct. 28, 2014

(54) CONTROL APPARATUS FOR INTERNAL COMBUSTION ENGINE

(75) Inventors: Kaoru Ohtsuka, Mishima (JP); Shinichi Soejima, Gotenba (JP); Keisuke Kawai, Odawara (JP); Hiroyuki Tanaka, Susono (JP); Hayato Nakada, Minamitsuru-gun (JP); Naoto Kato, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 914 days.

(21) Appl. No.: 13/002,260

(22) PCT Filed: May 29, 2009

(86) PCT No.: PCT/JP2009/059834

§ 371 (c)(1),
(2), (4) Date: Dec. 30, 2010

(87) PCT Pub. No.: WO2010/024007

PCT Pub. Date: Mar. 4, 2010

(65) Prior Publication Data

US 2011/0144885 A1 Jun. 16, 2011

(30) Foreign Application Priority Data

Aug. 26, 2008 (JP) ................................ 2008-216690

(51) Int. Cl.

*G06F 19/00* (2011.01)
*G06G 7/70* (2006.01)
*F02D 11/10* (2006.01)
*F02D 37/02* (2006.01)
*F02D 41/00* (2006.01)
*F02D 41/14* (2006.01)

(52) U.S. Cl.

CPC .............. *F02D 11/105* (2013.01); *F02D 37/02* (2013.01); *F02D 41/0002* (2013.01); *F02D 2041/1434* (2013.01); *F02D 2250/18* (2013.01)
USPC .......................................................... 701/102

(58) Field of Classification Search

CPC ......... Y02T 10/47; Y02T 10/40; Y02T 10/42; Y02T 10/44; Y02T 10/46; F02D 19/00; F02D 31/00; F02D 35/023; F02D 35/00; F02D 35/02
USPC ............... 123/406.12, 406.19, 406.2, 406.23, 123/434, 478, 480, 486, 673, 674; 701/101, 701/102, 103, 104, 105
See application file for complete search history.

(56) References Cited

U.S. PATENT DOCUMENTS

| | | | | |
|---|---|---|---|---|
| 6,729,297 | B2 * | 5/2004 | Futonagane et al. | 123/299 |
| 8,539,935 | B2 * | 9/2013 | Nakata et al. | 123/480 |
| 2010/0147262 | A1 * | 6/2010 | Martin et al. | 123/299 |

FOREIGN PATENT DOCUMENTS

| | | |
|---|---|---|
| JP | A-10-325348 | 12/1998 |
| JP | A-2006-200466 | 8/2006 |
| JP | A-2009-047102 | 3/2009 |

OTHER PUBLICATIONS

International Search Report in International Application No. PCT/JP2009/059834; dated Jul. 14, 2009 (with English-language translation).

*Primary Examiner* — Mahmoud Gimie
*Assistant Examiner* — Sizo Vilakazi
(74) *Attorney, Agent, or Firm* — Oliff PLC

(57) ABSTRACT

A control apparatus for an internal combustion engine is provided that can precisely reflect requirements relating to performance of the internal combustion engine in a control amount of each actuator by compensating for weaknesses in the so-called torque demand control. A requirement value of each of torque, efficiency, and an air-fuel ratio, and engine information are inputted to an engine inverse model. The engine inverse model is then used to calculate actuator requirement values for achieving those requirement values. An actuator direct requirement value directly required of each of actuators is also acquired. Control of the actuators is adapted to be changed between that according to the actuator requirement value and that according to the actuator direct requirement value.

25 Claims, 18 Drawing Sheets

2: THROTTLE
4: IGNITION DEVICE
6: FUEL INJECTION SYSTEM
12: ENGINE INFORMATION
10: FUNCTIONAL REQUIREMENTS
22: TORQUE REQUIREMENT
24: EFFICIENCY REQUIREMENT
26: A/F REQUIREMENT
30: TORQUE ACHIEVEMENT UNIT (ENGINE INVERSE MODEL)
42: TA DIRECT REQUIREMENT
44: SA DIRECT REQUIREMENT
46: A/F DIRECT REQUIREMENT
53: CHANGEOVER COMMANDING SUB-UNIT
52: CHANGEOVER
54: CHANGEOVER
56: CHANGEOVER

2: THROTTLE
4: IGNITION DEVICE
6: FUEL INJECTION SYSTEM
12: ENGINE INFORMATION
10: FUNCTIONAL REQUIREMENTS
22: TORQUE REQUIREMENT
24: EFFICIENCY REQUIREMENT
26: A/F REQUIREMENT
30: TORQUE ACHIEVEMENT UNIT (ENGINE INVERSE MODEL)
42: TA DIRECT REQUIREMENT
44: SA DIRECT REQUIREMENT
46: A/F DIRECT REQUIREMENT
58: CHANGEOVER COMMANDING SUB-UNIT
52: CHANGEOVER
54: CHANGEOVER
56: CHANGEOVER

22: TORQUE REQUIREMENT
24: EFFICIENCY REQUIREMENT
26: A/F REQUIREMENT
502: ACTUAL TORQUE
504: ACTUAL EFFICIENCY
506: ACTUAL A/F
520: SELECTION
508: DIFFERENCE DETERMINATION
510: DIFFERENCE DETERMINATION
512: DIFFERENCE DETERMINATION

S102: ACQUIRE TORQUE REQUIREMENT VALUE, EFFICIENCY REQUIREMENT VALUE, AND A/F REQUIREMENT VALUE
S104: DIRECT REQUIREMENT RANGE?
S106: CALCULATE TORQUE, EFFICIENCY, AND A/F ACHIEVED BY ACTUATOR DIRECT REQUIREMENT VALUE
S108: IS ACHIEVEMENT VALUE NEARLY EQUAL TO REQUIREMENT VALUE?
S110: SELECT DIRECT REQUIREMENT VALUE
S112: SELECT TORQUE ACHIEVEMENT UNIT REQUIREMENT VALUE

42: TA DIRECT REQUIREMENT
44: SA DIRECT REQUIREMENT
46: A/F DIRECT REQUIREMENT
22: TORQUE REQUIREMENT
24: EFFICIENCY REQUIREMENT
26: A/F REQUIREMENT
514: ENGINE MODEL
520: SELECTION
508: DETERMINATION
510: DETERMINATION
512: DETERMINATION

42: TA DIRECT REQUIREMENT
44: SA DIRECT REQUIREMENT
46: A/F DIRECT REQUIREMENT
30: TORQUE ACHIEVEMENT UNIT
520: SELECTION
530: DIFFERENCE DETERMINATION
532: DIFFERENCE DETERMINATION
534: DIFFERENCE DETERMINATION

Fig.9

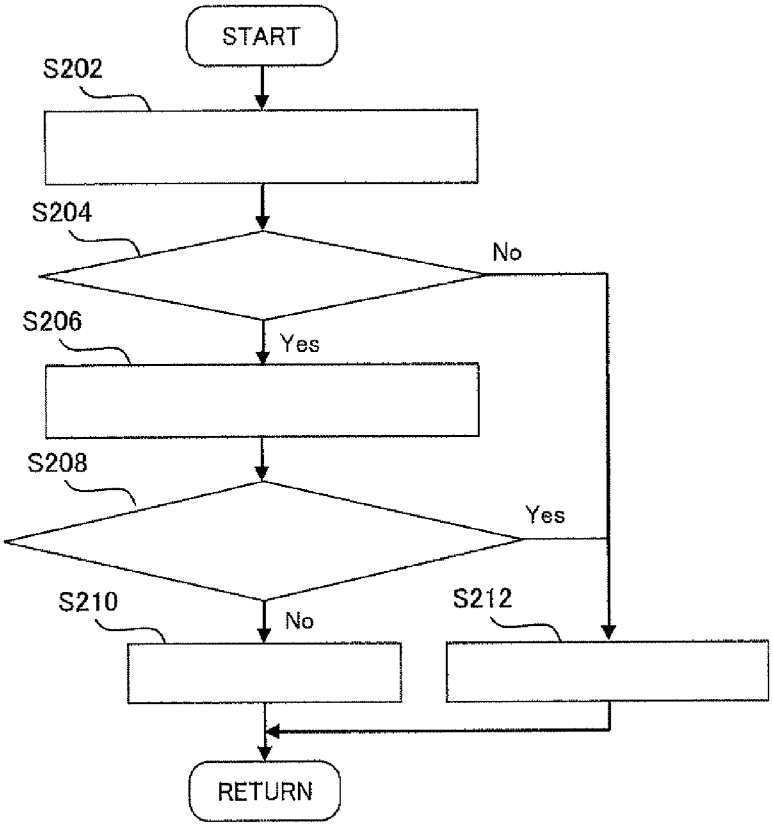

S202: ACQUIRE TA DIRECT REQUIREMENT VALUE, SA DIRECT REQUIREMENT VALUE, AND A/F DIRECT REQUIREMENT VALUE
S204: DIRECT REQUIREMENT RANGE?
S206: ACQUIRE TA REQUIREMENT VALUE, SA REQUIREMENT VALUE, AND A/F REQUIREMENT VALUE CALCULATED BY TORQUE ACHIEVEMENT UNIT
S208: IS DIRECT REQUIREMENT VALUE NEARLY EQUAL TO TORQUE ACHIEVEMENT UNIT REQUIREMENT VALUE?
S210: SELECT DIRECT REQUIREMENT VALUE
S212: SELECT TORQUE ACHIEVEMENT UNIT REQUIREMENT VALUE

2: THROTTLE
4: IGNITION DEVICE
6: FUEL INJECTION SYSTEM
12: ENGINE INFORMATION
10: FUNCTIONAL REQUIREMENTS
22: TORQUE REQUIREMENT
24: EFFICIENCY REQUIREMENT
26: A/F REQUIREMENT
30: TORQUE ACHIEVEMENT UNIT (ENGINE INVERSE MODEL)
42: TA DIRECT REQUIREMENT
44: SA DIRECT REQUIREMENT
46: A/F DIRECT REQUIREMENT
68: CHANGEOVER COMMANDING SUB-UNIT
62: CHANGEOVER
64: CHANGEOVER
66: CHANGEOVER

| | C1 | C2 | C3 | C4 | C5 | C6 | C7 | C8 |
|---|---|---|---|---|---|---|---|---|
| TA DIRECT REQUIREMENT | ○ | ○ | ○ | ○ | | | | |
| SA DIRECT REQUIREMENT | ○ | ○ | | | ○ | ○ | | |
| A/F DIRECT REQUIREMENT | ○ | | ○ | | ○ | | ○ | |

S302: IS THERE REQUIREMENT FOR CHANGE TO TORQUE ACHIEVEMENT UNIT CONTROL RANGE?
S304: IS THERE REQUIREMENT FOR EARLY CHANGE?
S306: CAN IGNITION CONTROL COMPENSATE FOR TQ?
S308: CHANGE TO TORQUE ACHIEVEMENT UNIT CONTROL RANGE
S310: PERFORM GRADUAL CHANGE CONTROL

S402: IS THERE REQUIREMENT FOR CHANGE TO TA/SA DIRECT REQUIREMENT RANGE?
S404: IS THERE REQUIREMENT FOR EARLY CHANGE?
S406: CHANGE TO TA DIRECT REQUIREMENT RANGE
S408: IS ACTUAL TA NEARLY EQUAL TO TA DIRECT REQUIREMENT VALUE?
S410: CHANGE TO TA/SA DIRECT REQUIREMENT RANGE

S502: IS COMBUSTION LIMIT EXCEEDED?
S504: IS A/F REQUIREMENT PRIORITY?
S506: PERFORM COMBUSTION IMPROVEMENT CONTROL BY A/F

S602: IS COMBUSTION LIMIT EXCEEDED?
S604: IS SA REQUIREMENT PRIORITY?
S606: PERFORM COMBUSTION IMPROVEMENT CONTROL BY IGNITION TIMING

CONTROL APPARATUS FOR INTERNAL COMBUSTION ENGINE

TECHNICAL FIELD

The present invention relates, in general, to control apparatuses for internal combustion engines, and more particularly to a control apparatus that allows requirements relating to various types of performance of an internal combustion engine to be satisfied through coordinated control of a plurality of actuators.

BACKGROUND ART

Operation of an internal combustion engine is controlled by a plurality of actuators. With a spark ignition type internal combustion engine, the operation is controlled through an adjustment of an intake air amount by a throttle, an adjustment of ignition timing by an ignition device, and an adjustment of an air-fuel ratio by a fuel supply system. A control amount (or an operation amount) of each of the plurality of actuators may be determined for each individual actuator. Use of torque demand control as disclosed in JP-A-10-325348, however, allows torque control accuracy to be enhanced through coordinated control of the plurality of actuators.

The torque demand control is a type of feed-forward control that represents requirements relating to performance of the internal combustion engine by torque and controls operation of various actuators so as to achieve the torque requirements. To perform the torque demand control, a model for deriving a control amount of each actuator from the torque requirement, specifically, an inverse model of the internal combustion engine is required. The engine inverse model may be formed of a map, a function, or a combination thereof. JP-A-10-325348 discloses a technique that enables the torque demand control by using a common model (called control target amount calculation means in the Publication) during an idle state and a non-idle state of an internal combustion engine.

SUMMARY OF THE INVENTION

Problems to be Solved by the Invention

The relationship between the control amount of each actuator and the torque in the internal combustion engine changes depending on an operating state or an operating condition of the internal combustion engine. To accurately calculate the control amount for achieving the torque requirement, therefore, information on the operating state or the operating condition becomes necessary. The required information may not, however, be obtainable depending on a condition, in which the internal combustion engine is placed. For example, the amount of air drawn into a cylinder may be calculated by using a throttle opening and an air flow sensor output value; however, at starting, it is difficult to calculate the amount of air drawn in accurately because of air previously present inside an intake pipe. If the engine information used in the torque demand control offers only a low reliability, torque control accuracy cannot be guaranteed.

Some internal combustion engines allow a cylinder combustion mode to be changed. For example, a known internal combustion engine is operated through homogeneous combustion under medium-to-heavy loads and through stratified combustion under light load. Completely different relationships between the control amount of each actuator and the torque, however, apply between the homogeneous combustion and the stratified combustion. As a result, if the above-mentioned engine inverse model is designed based on the homogeneous combustion, torque control cannot be performed during the stratified combustion by using the same engine inverse model.

As described above, the torque demand control has a number of weaknesses and, because of those weaknesses, performance requirements of the internal combustion engine have not been precisely reflected in the control amount of each actuator.

The present invention has been made to solve the foregoing problems and it is an object of the present invention to provide a control apparatus for an internal combustion engine that can reflect requirements relating to performance of the internal combustion engine precisely in the control amount of each actuator by compensating for weaknesses in the so-called torque demand control.

Means for Solving the Problems

To achieve the foregoing object, a first aspect of the present invention provides a control apparatus for an internal combustion engine whose operation is controlled by a single or multiple actuators, the control apparatus including: engine requirement value acquiring means for acquiring a single or multiple requirement values representing a single or multiple predetermined physical quantities (hereinafter referred to as an "engine requirement value") that determine an operation of the internal combustion engine; engine information acquiring means for acquiring information on a current operating state or operating condition of the internal combustion engine (hereinafter referred to as "engine information"); actuator requirement value calculating means having an engine inverse model that derives, from each value representing a corresponding one of the single or multiple predetermined physical quantities, a control amount of each of the single or multiple actuators for achieving the values in the internal combustion engine, the actuator requirement value calculating means calculating a control amount to be required of each of the single or multiple actuators (hereinafter referred to as an "actuator requirement value") by inputting each engine requirement value and the engine information to the engine inverse model; actuator direct requirement value acquiring means for acquiring a control amount to be directly required of each of the single or multiple actuators (hereinafter referred to as an "actuator direct requirement value"); and changeover means for changing control of the single or multiple actuators between that according to the actuator requirement value and that according to the actuator direct requirement value.

According to a second aspect of the present invention, in the first aspect of the present invention, the control apparatus further includes changeover commanding means for selecting, based on the engine information, either the control according to the actuator requirement value or the control according to the actuator direct requirement value and commanding the changeover means to change the control to that selected.

According to a third aspect of the present invention, in the second aspect of the present invention, the control apparatus is provided in which the changeover commanding means selects the control according to the actuator direct requirement value when the engine information acquired is low in reliability.

According to a fourth aspect of the present invention, in the second or third aspects of the present invention, the control apparatus is provided in which the changeover commanding means selects the control according to the actuator direct requirement value when the current operating state or operating condition of the internal combustion engine is not included in a condition of making the engine inverse model hold true.

According to a fifth aspect of the present invention, in any one of the second to fourth aspects of the present invention, the control apparatus further includes engine achievement value acquiring means for acquiring a value of the single or multiple predetermined physical quantities achieved by the internal combustion engine (hereinafter referred to as an “engine achievement value”); wherein the changeover commanding means commands the changeover means to change the control from that according to the actuator direct requirement value to that according to the actuator requirement value when, while the multiple actuators are being controlled according to the actuator direct requirement value, a difference of the engine achievement value from the engine requirement value for each of the single or multiple predetermined physical quantities falls within an acceptable range.

According to a sixth aspect of the present invention, in the fifth aspect of the present invention, the control apparatus is provided in which the engine achievement value acquiring means calculates the engine achievement value from the engine information acquired by the engine information acquiring means.

According to a seventh aspect of the present invention, in the fifth aspect of the present invention, the control apparatus is provided in which the engine achievement value acquiring means includes an engine model that derives, from each control amount of the single or multiple actuators, a value of the single or multiple predetermined physical quantities achieved by the control amount in the internal combustion engine; and the engine achievement value acquiring means calculates the engine achievement value by inputting each actuator direct requirement value in the engine model.

According to an eighth aspect of the present invention, in any one of the second to fourth aspects of the present invention, the control apparatus is provided in which the changeover commanding means commands the changeover means to change the control from that according to the actuator direct requirement value to that according to the actuator requirement value when, while the single or multiple actuators are being controlled according to the actuator direct requirement value, a difference of the actuator requirement value from the actuator direct requirement value for each of the multiple actuators falls within an acceptable range.

According to a ninth aspect of the present invention, in any one of the second to eighth aspects of the present invention, the control apparatus is provided in which the changeover means gradually changes control between that according to the actuator requirement value and that according to the actuator direct requirement value.

According to a tenth aspect of the present invention, in the first aspect of the present invention, the control apparatus is provided in which: the control apparatus is controlled in operation by multiple actuators; the changeover means changes the control of each of the multiple actuators individually between that according to the actuator requirement value and that according to the actuator direct requirement value; and the control apparatus further includes changeover commanding means for selecting, based on the engine information, either the control according to the actuator requirement value or the control according to the actuator direct requirement value individually for each of the multiple actuators and commanding the changeover means to change the control to that selected.

According to an 11th aspect of the present invention, in the tenth aspect of the present invention, the control apparatus is provided in which the changeover commanding means commands, when a changeover condition for changing from the control according to the actuator direct requirement value to the control according to the actuator requirement value for all or some of the multiple actuators is met, the changeover means to sequentially change the control of each applicable actuator to that according to the actuator requirement value according to a predetermined changeover sequence.

According to a 12th aspect of the present invention, in the 11th aspect of the present invention, the control apparatus is provided in which, in the changeover sequence, priority of each actuator is established according to torque response sensitivity to changes in the control amount.

According to a 13th aspect of the present invention, in any one of the tenth to 12th aspect of the present invention, the control apparatus is provided in which the changeover commanding means commands, when a changeover condition for changing from the control according to the actuator requirement value to the control according to the actuator direct requirement value for all or some of the multiple actuators is met, the changeover means to sequentially change the control of each applicable actuator to that according to the actuator direct requirement value according to a predetermined reverse changeover sequence.

According to a 14th aspect of the present invention, in the 13th aspect of the present invention, the control apparatus is provided in which, in the reverse changeover sequence, priority of each actuator is established according to torque control ability.

According to a 15th aspect of the present invention, in any one of the 11th to 14th aspects of the present invention, the control apparatus is provided in which the changeover commanding means commands the changeover means to change the control of all applicable actuators simultaneously, if a predetermined simultaneous changeover condition is met.

According to a 16th aspect of the present invention, in any one of the tenth to 15th aspects of the present invention, the control apparatus is provided in which the changeover means gradually changes control between that according to the actuator requirement value and that according to the actuator direct requirement value.

According to a 17th aspect of the present invention, in any one of the tenth to 16th aspects of the present invention, the control apparatus is provided in which the actuator requirement value calculating means includes correcting means for correcting, when some of the multiple actuators are controlled according to the actuator direct requirement value, the actuator requirement value of at least one actuator out of actuators not being controlled according to the actuator direct requirement value such that a relationship in control amounts among the multiple actuators does not exceed a combustion limit.

According to an 18th aspect of the present invention, in the 17th aspect of the present invention, the control apparatus is provided in which the correcting means corrects the actuator requirement value with low achievement priority based on the actuator direct requirement value and the actuator requirement value with high achievement priority.

According to a 19th aspect of the present invention, in the tenth aspect of the present invention, the control apparatus is provided in which: one of the single or multiple predetermined physical quantities is torque and the engine requirement value acquired by the engine requirement value acquiring means includes a torque requirement value; the multiple actuators include an intake actuator for adjusting an intake air amount and an ignition actuator for adjusting ignition timing; the engine inverse model includes: means for calculating, based on the torque requirement value, an intake actuator requirement value to be required of the intake actuator; means for estimating, based on the engine information, a torque value to be achieved by an operation of the intake actuator; and means for calculating an ignition actuator requirement value to be required of the ignition actuator so as to compensate for a difference between the torque requirement value and the estimated torque value; and the changeover commanding means commands, when a changeover condition for changing from the control according to the actuator direct requirement value to the control according to the actuator requirement value is met for the intake actuator and the ignition actuator, the changeover means to change the control of the ignition actuator from that according to an ignition actuator direct requirement value to that according to the ignition actuator requirement value; determines, based on a relationship between the ignition actuator requirement value and an adjustable range of the ignition timing, whether or not compensation is feasible for torque deviation as calculated from a current difference between an intake actuator direct requirement value and the intake actuator requirement value through the adjustment of the ignition timing; and commands, if determined that the compensation is not feasible, the changeover means to gradually change the control of the intake actuator from that according to the intake actuator direct requirement value to that according to the intake actuator requirement value.

According to a 20th aspect of the present invention, in the 19th aspect of the present invention, the control apparatus is provided in which the changeover commanding means commands the changeover means to swiftly change the control to that according to the intake actuator requirement value when, in a process of gradually changing the control amount of the intake actuator from the intake actuator direct requirement value to the intake actuator requirement value, the compensation for the torque deviation through the adjustment of the ignition timing becomes feasible.

According to a 21st aspect of the present invention, in the 19th or 20th aspects of the present invention, the control apparatus is provided in which the changeover commanding means commands, when a predetermined early changeover condition is met, the changeover means to change the control of the ignition actuator to that according to the ignition actuator requirement value and the control of the intake actuator to that according to the intake actuator requirement value.

According to a 22nd aspect of the present invention, in the tenth aspect of the present invention, the control apparatus is provided in which: one of the single or multiple predetermined physical quantities is torque and the engine requirement value acquired by the engine requirement value acquiring means includes a torque requirement value; the multiple actuators include an intake actuator for adjusting an intake air amount and an ignition actuator for adjusting ignition timing; the engine inverse model includes: means for calculating, based on the torque requirement value, an intake actuator requirement value to be required of the intake actuator; means for estimating, based on the engine information, a torque value to be achieved by an operation of the intake actuator; and means for calculating an ignition actuator requirement value to be required of the ignition actuator so as to compensate for a difference between the torque requirement value and the estimated torque value; and the changeover commanding means commands, when a changeover condition for changing from the control according to the actuator requirement value to the control according to the actuator direct requirement value is met for the intake actuator and the ignition actuator, the changeover means to change the control of the intake actuator from that according to the intake actuator requirement value to that according to an intake actuator direct requirement value; and thereafter commands the changeover means to change the control of the ignition actuator from that according to the ignition actuator requirement value to that according to an ignition actuator direct requirement value.

According to a 23rd aspect of the present invention, in the 22nd aspect of the present invention, the control apparatus is provided in which the changeover commanding means commands the changeover means to change the control of the ignition actuator from that according to the ignition actuator requirement value to that according to the ignition actuator direct requirement value, when a difference between a value achieved by the intake actuator and the intake actuator requirement value falls within an acceptable range after the control of the intake actuator is changed from that according to the intake actuator requirement value to that according to the intake actuator direct requirement value.

According to a 24th aspect of the present invention, in the 22nd or 23rd aspect of the present invention, the control apparatus is provided in which the changeover commanding means commands, when a predetermined early changeover condition is met, the changeover means to change the control of the intake actuator to that according to the intake actuator requirement value and the control of the ignition actuator to that according to the ignition actuator requirement value.

Effects of the Invention

According to the first aspect of the present invention, a single or multiple engine requirement values that determine the operation of the internal combustion engine are acquired and each of the engine requirement values, together with the engine information, is inputted to the engine inverse model. The actuator requirement value to be required of each actuator is thereby generated. In addition, the actuator direct requirement value to be directly required of each actuator is also acquired.

The former control according to the actuator requirement value is feedforward control using the engine inverse model, offering an advantage that each of the actuators can be operated in a mutually coordinated manner toward achievement of requirements relating to performance of the internal combustion engine. The control, however, has a disadvantage that, when accurate engine information cannot be obtained or the operating state or operating condition of the internal combustion engine is not included in the condition that makes the engine inverse model hold true, accuracy of the actuator requirement value is degraded or an effective actuator requirement value cannot be obtained, resulting in the requirements relating to performance of the internal combustion engine not being achieved.

The latter control according to the actuator direct requirement value, on the other hand, offers an advantage that the actuator can be made to precisely perform a predetermined operation based on the requirements relating to the performance of the internal combustion engine, without being affected by the operating state or operating condition of the internal combustion engine. If there is a plurality of requirements relating to the performance of the internal combustion engine, however, the control is disadvantageous in that it is unable to perform a coordinated control of operations of the actuators by mediating the plurality of requirements.

The control according to the actuator requirement value and that according to the actuator direct requirement value have their own advantages and disadvantages as described above. The advantage of first control is complementary to the disadvantage of second control, and the advantage of the second control is complementary to the advantage of the first control. If the control according to the actuator requirement value and that according to the actuator direct requirement value are mutually exclusively selectable as in the first aspect of the present invention, therefore, selection of the more advantageous control allows the requirements relating to the performance of the internal combustion engine to be precisely reflected in the control amount of each of the actuators.

According to the second aspect of the present invention, the engine information used in the engine inverse model for calculating the actuator requirement value is used as information for determining whether to select the control according to the actuator requirement value or the control according to the actuator direct requirement value. The engine information allows a situation to be predicted, in which the control according to the actuator requirement value is advantageous or disadvantageous. The more advantageous control can therefore be precisely selected by making a changeover decision based on the engine information.

If, for example, the engine information acquired is low in reliability, accuracy in the actuator requirement value calculated using the poorly reliable engine information is also low. The engine information may be low in reliability when, for example, the sensor for acquiring the engine information is not activated, the object sensed by the sensor remains unstable, and calculation conditions for calculating the engine information are incomplete yet. According to the third aspect of the present invention, the control according to the actuator direct requirement value is selected, instead of the control according to the actuator requirement value, in such a case, so that the low reliability of the engine information can be prevented from adversely affecting the operation of the actuators.

The engine inverse model cannot be used for calculating the control amounts of the actuators, if the current operating state or operating condition of the internal combustion engine is not included in the condition that makes the engine inverse model hold true. For example, if the engine inverse model is designed based on homogeneous combustion, it no longer holds true when stratified combustion is selected for an operating mode. When the engine inverse model includes a physical model, it does not hold true, if the operating state or operating condition of the internal combustion engine deviates from a prerequisite for the physical model. Similarly, when the engine inverse model includes a statistical model, it does not hold true, if the operating state of the internal combustion engine deviates sharply from a data range of the statistical model. According to the fourth aspect of the present invention, the control according to the actuator direct requirement value is selected in such cases, instead of the control according to the actuator requirement value, so that the operation of the actuators can be guaranteed in situations in which the engine inverse model does not hold true.

If there is a difference between the engine achievement value achieved through the control according to the actuator direct requirement value and that achieved by selecting the control according to the actuator requirement value, the changeover from the actuator direct requirement value to the actuator requirement value involves discontinuous fluctuations in the operation of the internal combustion engine. In this respect, according to the fifth aspect of the present invention, the condition for the changeover is that the difference between the engine achievement value achieved through the control according to the actuator direct requirement value and the engine requirement value that serves as a basis for calculating the actuator requirement value should fall within an acceptable range. This ensures that the engine achievement values are continuously linked before and after the changeover. Specifically, according to the fifth aspect of the present invention, the discontinuous fluctuations in the operation of the internal combustion engine involved in the changeover can be prevented from occurring. If, for example, torque is included in the predetermined physical quantities, torque steps can be prevented from occurring at the changeover.

According to the sixth aspect of the present invention, use of the engine information available while the control according to the actuator direct requirement value is underway allows the engine achievement value actually achieved at that particular point in time to be accurately calculated.

According to the seventh aspect of the present invention, an engine model that corresponds to an inverse model of the abovementioned engine inverse model is prepared. Each of the actuator direct requirement values is then inputted to this engine model to thereby allow the engine achievement value to be achieved through the control according to the actuator direct requirement value to be accurately estimated and calculated.

Additionally, a discontinuous operation of the actuator results, if there is a difference between the actuator direct requirement value and the actuator requirement value when the control according to the actuator direct requirement value is changed to the control according to the actuator requirement value. In this respect, according to the eighth aspect of the present invention, the condition for the changeover is that the difference of the actuator requirement value from the actuator direct requirement value should fall within an acceptable range for each of the multiple actuators, so that the operation of the actuator is continuously linked before and after the changeover. Specifically, according to the eighth aspect of the present invention, discontinuous operations of the actuators occurring in conjunction with the changeover can be prevented from occurring, so that discontinuous fluctuations in the operation of the internal combustion engine occurring therefrom can be prevented from occurring. If, for example, the actuators include a throttle valve, torque steps occurring as a result of a sudden change in the throttle valve opening can be prevented from occurring.

Additionally, according to the ninth aspect of the present invention, the changeover from the control according to the actuator requirement value to the control according to the actuator direct requirement value, or vice versa, is gradually performed. Should there be a difference between the actuator requirement value and the actuator direct requirement value, or should there be a difference between the engine achievement value achieved through the control according to the actuator requirement value and that achieved through the control according to the actuator direct requirement value, the discontinuous operation of the internal combustion engine occurring from the difference can be inhibited.

According to the tenth aspect of the present invention, the changeover between the control according to the actuator requirement value and that according to the actuator direct requirement value can be performed individually for each of the multiple actuators. The more advantageous control can therefore be selected for each actuator. Specifically, according to the tenth aspect of the present invention, each of the multiple actuators can be appropriately operated, so that accuracy in achieving the requirements relating to the performance of the internal combustion engine can be enhanced.

According to the 11th aspect of the present invention, when the changeover condition for changing from the control according to the actuator direct requirement value to that according to the actuator requirement value for all or some of the multiple actuators is met, the control of each applicable actuator is sequentially changed according to a predetermined changeover sequence, instead of the control of all actuators being changed all at once. Discontinuity in the operation of the internal combustion engine occurring as a result of the changeover of the control of each actuator can therefore be inhibited.

At this time, the actuator, whose control is changed earlier, operates so as to achieve the requirements relating to the performance of the internal combustion engine based on the control amounts of the other actuators, whose control is changed thereafter. Consequently, according to the 12th aspect of the present invention, the changeover sequence is in order of higher torque response sensitivity to changes in the control amount, so that an operation performed by the actuator, whose control is changed earlier, for torque adjustment helps inhibit torque fluctuations occurring as a result of the changeover of control of the other actuators thereafter. Specifically, according to the 12th aspect of the present invention, torque steps occurring as a result of the changeover of the control of each actuator can be effectively inhibited.

According to the 13th aspect of the present invention, when the changeover condition for changing from the control according to the actuator requirement value to that according to the actuator direct requirement value for all or some of the multiple actuators is met, the control of each applicable actuator is sequentially changed according to a predetermined reverse changeover sequence, instead of the control of all actuators being changed all at once. Discontinuity in the operation of the internal combustion engine occurring as a result of the changeover of the control of each actuator can therefore be inhibited.

According to the 14th aspect of the present invention, in particular, the actuator having high torque control ability is the first, for which the control is changed to that according to the actuator direct requirement value. Torque controllability at the changeover can thereby be guaranteed, while torque steps occurring as a result of discontinuous operation of the internal combustion engine can be inhibited.

According to the 15th aspect of the present invention, the control of all applicable actuators may be changed simultaneously. By enabling selection of the sequential changeover or the simultaneous changeover, the selection of the sequential changeover allows inhibition of discontinued operation of the internal combustion engine to be given priority in some situations. In other situations, the selection of the simultaneous changeover allows a prompt changeover of the control to be given priority.

According to the 16th aspect of the present invention, the control is changed between that according to the actuator requirement value and that according to the actuator direct requirement value gradually. Should there be a difference between the actuator requirement value and the actuator direct requirement value, the discontinuous operation of the internal combustion engine occurring from the difference can be inhibited.

If all actuators are controlled according to the actuator requirement value, coordinated control via the engine inverse model can make the relationship in control amounts among the multiple actuators fall within a combustion limit. If some of the actuators are controlled according to the actuator direct requirement value, however, the control amounts of those actuators are set independently of the control amounts of other actuators. In such a case, according to the 17th aspect of the present invention, the actuator requirement value of any of the actuators not being controlled according to the actuator direct requirement value is corrected such that the relationship in the control amounts among the multiple actuators does not exceed the combustion limit. According to the 17th aspect of the present invention, therefore, the relationship in the control amounts among the multiple actuators can be made to fall within the combustion limit as when all actuators are controlled according to the actuator requirement value, even if some of the actuators are controlled according to the actuator direct requirement value.

According to the 18th aspect of the present invention, the actuator requirement value with low achievement priority is corrected, so that the actuator requirement value with high achievement priority can be achieved as is. Because the actuator requirement value with high achievement priority and the actuator direct requirement value are reflected in that correction, the actuator requirement value to be corrected can be appropriately corrected such that the relationship in the control amounts among the actuators can be made to fall within the combustion limit.

According to the 19th aspect of the present invention, when a changeover condition for changing from the control according to the actuator direct requirement value to the control according to the actuator requirement value is met for the intake actuator and the ignition actuator, the control of the ignition actuator is first changed from that according to the ignition actuator direct requirement value to that according to the ignition actuator requirement value. If this results in the control of the intake actuator being changed from that according to the intake actuator direct requirement value to that according to the intake actuator requirement value, the ignition timing is automatically adjusted so as to compensate for the torque deviation produced from the difference between the two values. Note herein that the adjustment of the ignition timing has better torque response sensitivity than the adjustment of the intake air amount; still, there is a limit to the range of torque to be adjusted. According to the 19th aspect of the present invention, if the relationship between the ignition actuator requirement value and the adjustable range of the ignition timing indicates that the compensation of the torque deviation is not feasible by the adjustment of the ignition timing, the control of the intake actuator is gradually changed from that according to the intake actuator direct requirement value to that according to the intake actuator requirement value. The torque step involved in the changeover can therefore be prevented from occurring even with a large difference between the intake actuator direct requirement value and the intake actuator requirement value.

According to the 20th aspect of the present invention, when the compensation for the torque deviation through the adjustment of the ignition timing becomes feasible, the control of the intake actuator is swiftly changed to that according to the intake actuator requirement value. The control can therefore be swiftly changed to that according to the actuator requirement value, while preventing the torque step from occurring.

According to the 21st aspect of the present invention, the control of the ignition actuator and that of the intake actuator can be simultaneously changed from that according to the actuator direct requirement value to that according to the actuator requirement value. A swift control shift to the control according to the actuator requirement value can therefore be achieved preferentially, if necessary, over the prevention of occurrence of the torque step.

According to the 22nd aspect of the present invention, when a changeover condition for changing from the control according to the actuator requirement value to the control according to the actuator direct requirement value is met for the intake actuator and the ignition actuator, the control of the intake actuator is first changed from that according to the intake actuator requirement value to that according to the intake actuator direct requirement value. During this changeover, a difference can occur between the intake actuator requirement value and the intake actuator direct requirement value. The engine inverse model is used to calculate the ignition actuator requirement value so as to compensate for the torque deviation produced from the difference, and the ignition timing is thus automatically adjusted. The torque step involved in the changeover can therefore be prevented from occurring even with a large difference between the intake actuator requirement value and the intake actuator direct requirement value. Additionally, the intake actuator having high torque control ability is the first, for which the control is changed to that according to the actuator direct requirement value. Torque controllability until the changeover for all is completed can therefore be guaranteed.

According to the 23rd aspect of the present invention, the control of the ignition actuator is changed from that according to the ignition actuator requirement value to that according to the ignition actuator direct requirement value only after a difference between the value achieved by the intake actuator and the intake actuator requirement value falls within an acceptable range. This helps prevent the torque step involved in the changeover of the control of the ignition actuator from occurring.

According to the 24th aspect of the present invention, the control of the intake actuator and that of the ignition actuator can be simultaneously changed from that according to the actuator requirement value to that according to the actuator direct requirement value. A swift control shift to the control according to the actuator direct requirement value can therefore be achieved preferentially, if necessary, over the prevention of occurrence of the torque step.

BRIEF DESCRIPTION OF THE DRAWINGS

FIG. 9 is a flowchart showing a changeover control routine performed in the fourth embodiment of the present invention.

BEST MODES FOR CARRYING OUT THE INVENTION

First Embodiment

A first embodiment of the present invention will be described below with reference to FIGS. 1 through 4.

As preconditions for this embodiment, specifications of an internal combustion engine according to this embodiment will be described. The internal combustion engine according to this embodiment is a spark ignition type internal combustion engine, having actuators for adjusting an intake air amount, ignition timing, and an air-fuel ratio. The internal combustion engine normally operates through homogeneous combustion, while being capable of operating through stratified combustion under limited conditions, such as under a fairly light load condition. The internal combustion engine according to this embodiment shares the same specifications with those according to second through ninth embodiments of the present invention to be described later.

Figure 1:
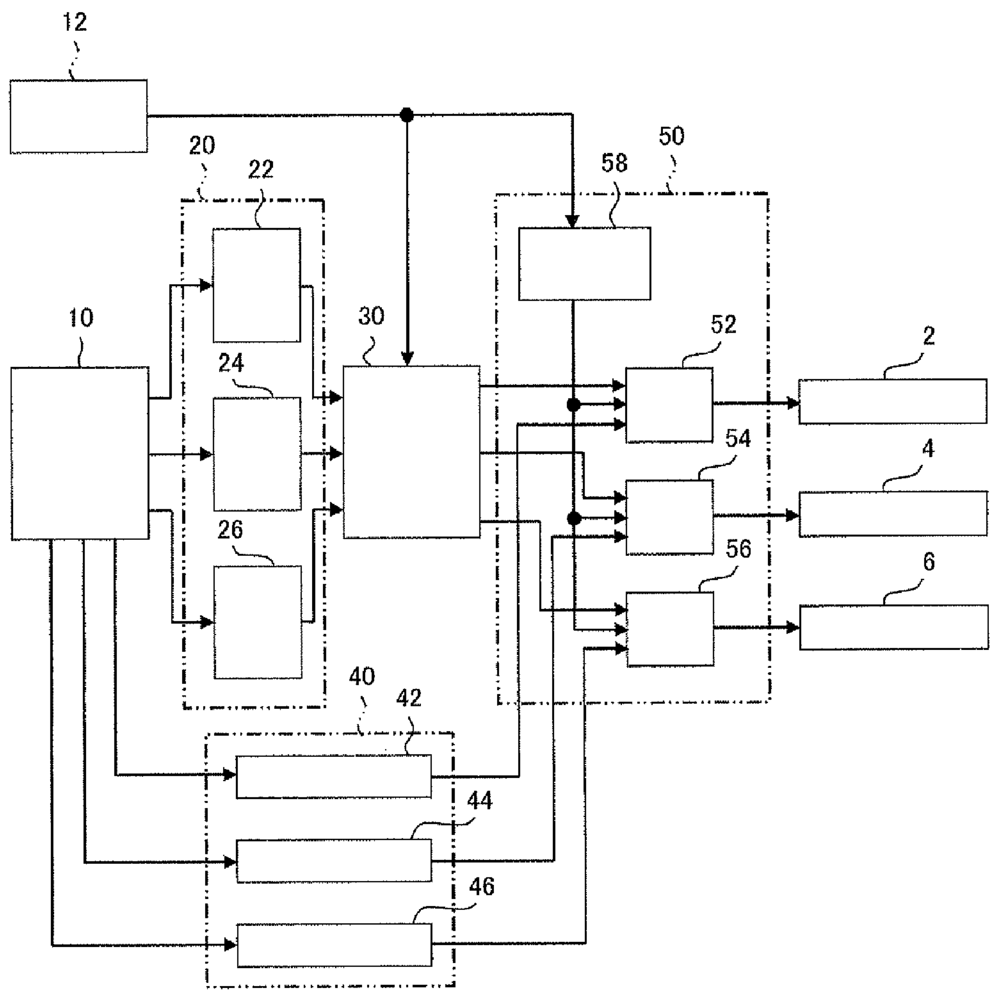
FIG. 1 is a block diagram showing an arrangement of a control apparatus for an internal combustion engine according to a first embodiment of the present invention.

A control apparatus according to this embodiment is configured as shown in the block diagram of FIG. 1. In FIG. 1, each element of the control apparatus is shown in a block, with signals (major) transmitted from one block to another being indicated by arrows. General arrangements and characteristics of the control apparatus according to this embodiment will be described below with reference to FIG. 1. To enable a deeper understanding of the characteristics of this embodiment, the embodiment will be described by using a detailed drawing as may be necessary.

Referring to FIG. 1, the control apparatus includes five major units 10, 20, 30, 40, and 50. Of these, a performance requirement generating unit 10 is placed at the highest level of hierarchy. An engine requirement value generating unit 20 is placed at a level lower than that of the performance requirement generating unit 10 and a torque achievement unit 30 is placed at a level lower than that of the engine requirement value generating unit 20. In addition, an actuator direct requirement value generating unit 40 is placed in parallel with the engine requirement value generating unit 20 and the torque achievement unit 30 at a level lower than that of the performance requirement generating unit 10. A selection changeover unit 50 is placed at a level lower than that of the torque achievement unit 30 and the actuator direct requirement value generating unit 40.

Actuators 2, 4, and 6 that control operations of the internal combustion engine are connected to the selection changeover unit 50. The internal combustion engine according to this embodiment includes, as the actuators, a throttle valve 2, an ignition device 4, and a fuel injection system 6. The throttle valve 2 adjusts the intake air amount. The ignition device 4 adjusts the ignition timing. The fuel injection system 6 adjusts the air-fuel ratio.

Note also that various types of signals are being transmitted inside the control apparatus, in addition to those transmitted between the blocks as indicated by the arrows in FIG. 1. An example of such signals is that which includes information on an operating condition or an operating state of the internal combustion engine (hereinafter referred to as "engine information") supplied from an external information generating source 12. The engine information transmitted from the information generating source 12 includes, for example, an engine speed, an output value of a throttle valve opening sensor, an output value of an air flow sensor, an output value of an air-fuel ratio sensor, current actual ignition timing, a coolant temperature, intake and exhaust valve timing, and an operating mode. The information generating source 12 acquires at least part of the engine information from sensors disposed internally and externally of the internal combustion engine.

Arrangements of each of the units 10, 20, 30, 40, and 50 that make up the control apparatus and processing performed therein will be described below in sequence.

The performance requirement generating unit 10 translates requirements relating to performance of the internal combustion engine into respective numerical values and outputs the numerical values. Performance of the internal combustion engine includes, for example, drivability, exhaust gases, fuel economy, noise, and vibration and may be translated into functions of the internal combustion engine. Control amounts of the actuators 2, 4, and 6 are determined through calculation. This allows the performance requirements to be reflected in the control amounts of the actuators 2, 4, and 6 by quantifying the performance requirements. The performance requirement generating unit 10 quantifies the performance requirements by representing various types of performance requirements in terms of physical quantities that may be divided into the following two groups.

A first group of physical quantities used by the performance requirement generating unit 10 to represent the performance requirements includes the three types of physical quantities of torque, efficiency, and air-fuel ratio (hereinafter referred to as "A/F"). "Efficiency" as the term is herein used refers to a ratio of torque that is actually outputted to potential torque to be outputted by the internal combustion engine. The internal combustion engine outputs heat and exhaust gases, in addition to the torque, and a whole of these outputs determines the various types of performance of the internal combustion engine, such as the abovementioned drivability, exhaust gases, and fuel economy. Parameters for controlling these outputs may be consolidated into the three types of physical quantities of torque, efficiency, and A/F. Consequently, the performance requirements can be precisely reflected in the output of the internal combustion engine by representing the performance requirements with the three types of physical quantities of torque, efficiency, and A/F.

To enable an even deeper understanding, representation of the performance requirements in terms of torque, efficiency, and A/F will be exemplified. Take, for instance, a requirement relating to drivability. This requirement may be represented by torque and efficiency. Specifically, if the requirement is acceleration of a vehicle, then the requirement may be represented by torque. If the requirement is prevention of an engine stall, the requirement may be represented by efficiency (more specifically, increased efficiency). According to the above-referenced definition, a maximum value of efficiency is 1, at which the potential torque to be outputted by the internal combustion engine is actually directly outputted. If the efficiency is smaller than 1, the torque actually outputted is smaller than the potential torque to be outputted by the internal combustion engine, with an allowance involved therein being outputted from the internal combustion engine mainly as heat.

A requirement relating to the exhaust gas may be represented by efficiency or A/F. Specifically, if a requirement is to warm up a catalyst, the requirement can be represented by efficiency (specifically, decreased efficiency) or A/F. By decreased efficiency, an exhaust gas temperature can be increased. By A/F, an ambience can be developed in which the catalyst is easier to react.

A requirement relating to fuel economy may be represented by efficiency or A/F. Specifically, if a requirement is to increase combustion efficiency, the requirement may be represented by efficiency (specifically, increased efficiency). If a requirement is to reduce a pump loss, the requirement may be represented by A/F (specifically, a lean burn).

Each of the various types of performance requirements is generated independently of each other in the performance requirement generating unit 10. As a result, the requirement value of torque, efficiency, or A/F outputted from the performance requirement generating unit 10 is not necessarily one per physical quantity. Take, for example, the torque. Outputted simultaneously with the torque required by a driver (torque calculated from an accelerator opening) may be torque required by various types of devices relating to vehicle control, including a VSC (vehicle stability control system), a TRC (traction control system), an ABS (antilock brake system), and a transmission. The same holds true also for efficiency and A/F.

A second group of physical quantities used by the performance requirement generating unit 10 to represent the performance requirements includes physical quantities that directly specify the operation of each of the actuators 2, 4, and 6. Examples of such physical quantities are the throttle valve opening and the intake air amount for the throttle valve 2. For the ignition device 4, the physical quantities correspond, for example, to an ignition retard amount and efficiency. For the fuel injection system 6, the physical quantities correspond, for example, to the A/F and a fuel injection amount.

As described earlier, the parameters for directly controlling the outputs of the internal combustion engine are the torque, efficiency, and A/F that are the physical quantities of the first group. The physical quantities of the second group are directly parameters for controlling the torque, efficiency, and A/F and are indirectly involved in the output of the internal combustion engine via the operation of each of the actuators 2, 4, and 6. As representation for reflecting the performance requirements in the output of the internal combustion engine, therefore, representation in terms of the physical quantities of the first group has a higher degree of freedom and higher reflection accuracy. By representation in terms of the physical quantities of the second group, however, a predetermined operation of each of the actuators 2, 4, and 6 can be performed precisely based on the performance requirement.

The performance requirement generating unit 10 quantifies the same performance requirement by representing the same by the physical quantities of the first group and those of the second group, respectively. The performance requirement quantified by the physical quantities of the first group is supplied to the engine requirement value generating unit 20, while the performance requirement quantified by the physical quantities of the second group is supplied to the actuator direct requirement value generating unit 40. Note that, whereas quantification of the performance requirement by the physical quantities of the first group is performed at all times, quantification of the performance requirement by the physical quantities of the second group is performed only if a predetermined condition is satisfied. Examples of the predetermined conditions include that the performance requirement issued is concerned with a specific control, such as control during starting and control for fuel cut. Another example of the predetermined condition is when a specific operating mode, such as the stratified combustion mode, is selected. Still another example of the predetermined condition is when reliability of the engine information is low, such as when a sensor is not activated.

The engine requirement value generating unit 20 will be described. The performance requirement generating unit 10 outputs a plurality of performance requirements represented by torque, efficiency, or A/F as described above. It is, however, not possible to achieve all of these performance requirements simultaneously and perfectly. This is because only one torque can be achieved even with a plurality of torque requirements. Similarly, only one efficiency can be achieved even with a plurality of efficiency requirements and only one A/F can be achieved even with a plurality of A/F requirements. This necessitates processing for mediating the requirements.

The engine requirement value generating unit 20 mediates requirements (requirement values) outputted from the performance requirement generating unit 10. The engine requirement value generating unit 20 includes mediatory sub-units 22, 24, and 26 for respective physical quantities as classified according to the requirements. The torque mediatory sub-unit 22 mediates a plurality of requirement values represented by torque into a single torque requirement value. The efficiency mediatory sub-unit 24 mediates a plurality of requirement values represented by efficiency into a single efficiency requirement value. The A/F mediatory sub-unit 26 mediates a plurality of requirement values represented by A/F into a single A/F requirement value. Each of the mediatory sub-units 22, 24, and 26 performs mediation in accordance with predetermined rules. The predetermined rules as the term is herein used refer to calculation rules for obtaining a single numerical value from a plurality of numerical values including, for example, selecting a maximum value, selecting a minimum value, averaging, and adding, or a combination thereof. Specific applicable rules are, however, left to design and the present invention is not concerned with specific details of the rules.

Figure 2:
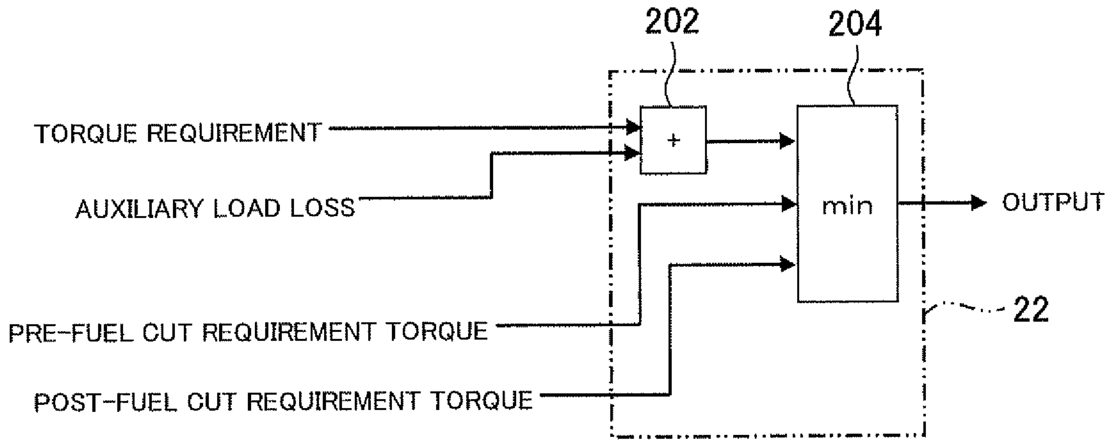
FIG. 2 is a block diagram showing an arrangement of a torque mediation unit according to the first embodiment of the present invention.

To enable an even deeper understanding of mediation, specific examples will be given below. FIG. 2 is a block diagram showing an arrangement of the torque mediatory sub-unit 22. In this example, the torque mediatory sub-unit 22 includes an adder element 202 and a minimum value selecting element 204. Requirement values consolidated by the torque mediatory sub-unit 22 in this example are driver requirement torque, auxiliary load loss torque, pre-fuel cut requirement torque, and post-fuel cut requirement torque. A value finally obtained as a result of consolidation by each of the elements 202, 204 is outputted as a mediated torque requirement value from the torque mediatory sub-unit 22.

Figure 3:
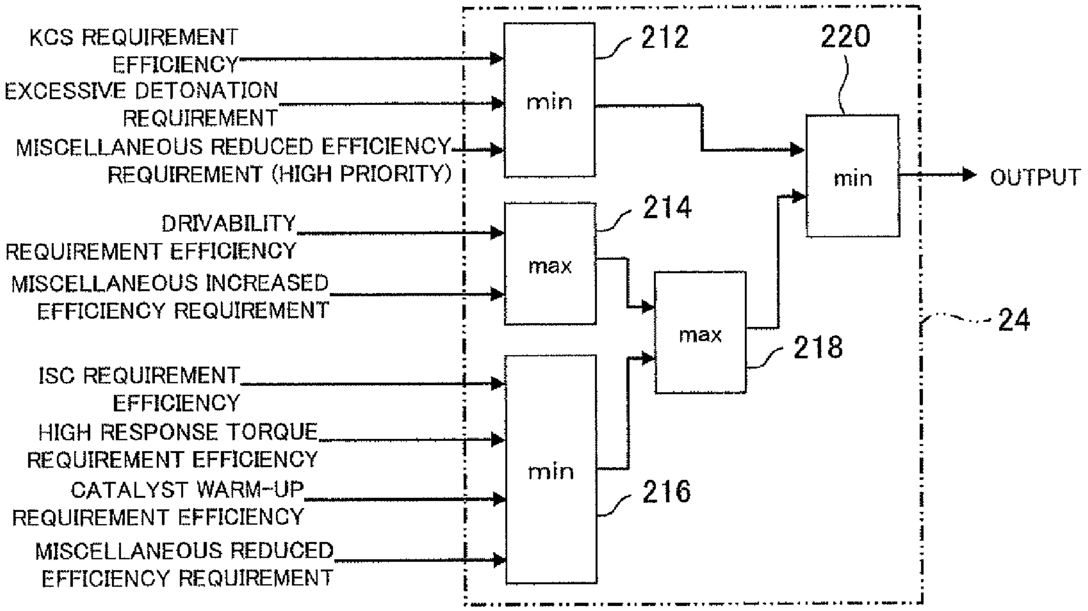
FIG. 3 is a block diagram showing an arrangement of an efficiency mediation unit according to the first embodiment of the present invention.

FIG. 3 is a block diagram showing an arrangement of the efficiency mediatory sub-unit 24. In this example, the efficiency mediatory sub-unit 24 includes three minimum value selecting elements 212, 216, and 220 and two maximum value selecting elements 214 and 218. Requirement values consolidated by the efficiency mediatory sub-unit 24 in this example include, for example, drivability requirement efficiency as an increased efficiency requirement, ISC requirement efficiency, high response torque requirement efficiency, and catalyst warm-up requirement efficiency as decreased efficiency requirements, and KCS requirement efficiency and excessive detonation requirement efficiency as decreased efficiency requirements having an even higher priority. A value finally obtained as a result of consolidation by each of the elements 212, 214, 216, 218, and 220 is outputted as a mediated efficiency requirement value from the efficiency mediatory sub-unit 24.

Though specific examples will be omitted, the air-fuel ratio mediatory sub-unit 26 performs similar operations. As described earlier, how to configure the A/F mediatory sub-unit 26 by combining different elements falls under a design matter and the elements may be appropriately combined based on a design concept of a designer. Each of the mediatory sub-units 22, 24, and 26 performs the mediation as described above, so that the engine requirement value generating unit 20 outputs a single torque requirement value, a single efficiency requirement value, and a single A/F requirement value.

The torque achievement unit 30 will be described below. The torque achievement unit 30 includes an engine inverse model as an inverse model of the internal combustion engine. Each of the engine requirement values (the torque requirement value, the efficiency requirement value, and the A/F requirement value) supplied from the engine requirement value generating unit 20 and the required engine information, such as the engine speed, is inputted to the engine inverse model. This allows a control amount to be required of each of the actuators 2, 4, and 6, specifically, an actuator requirement value (hereinafter referred to as a "torque achievement unit requirement value") to be calculated.

The engine inverse model is formed of a plurality of statistical models or physical models represented by maps or functions. Configuration of the engine inverse model characterizes control characteristics of the internal combustion engine by the control apparatus. The engine inverse model according to this embodiment is adapted to achieve preferentially the torque requirement value of the three engine requirement values supplied from the engine requirement value generating unit 20. In addition, the engine inverse model according to this embodiment is designed based on homogeneous combustion of all the combustion modes that the internal combustion engine can assume.

Figure 4:
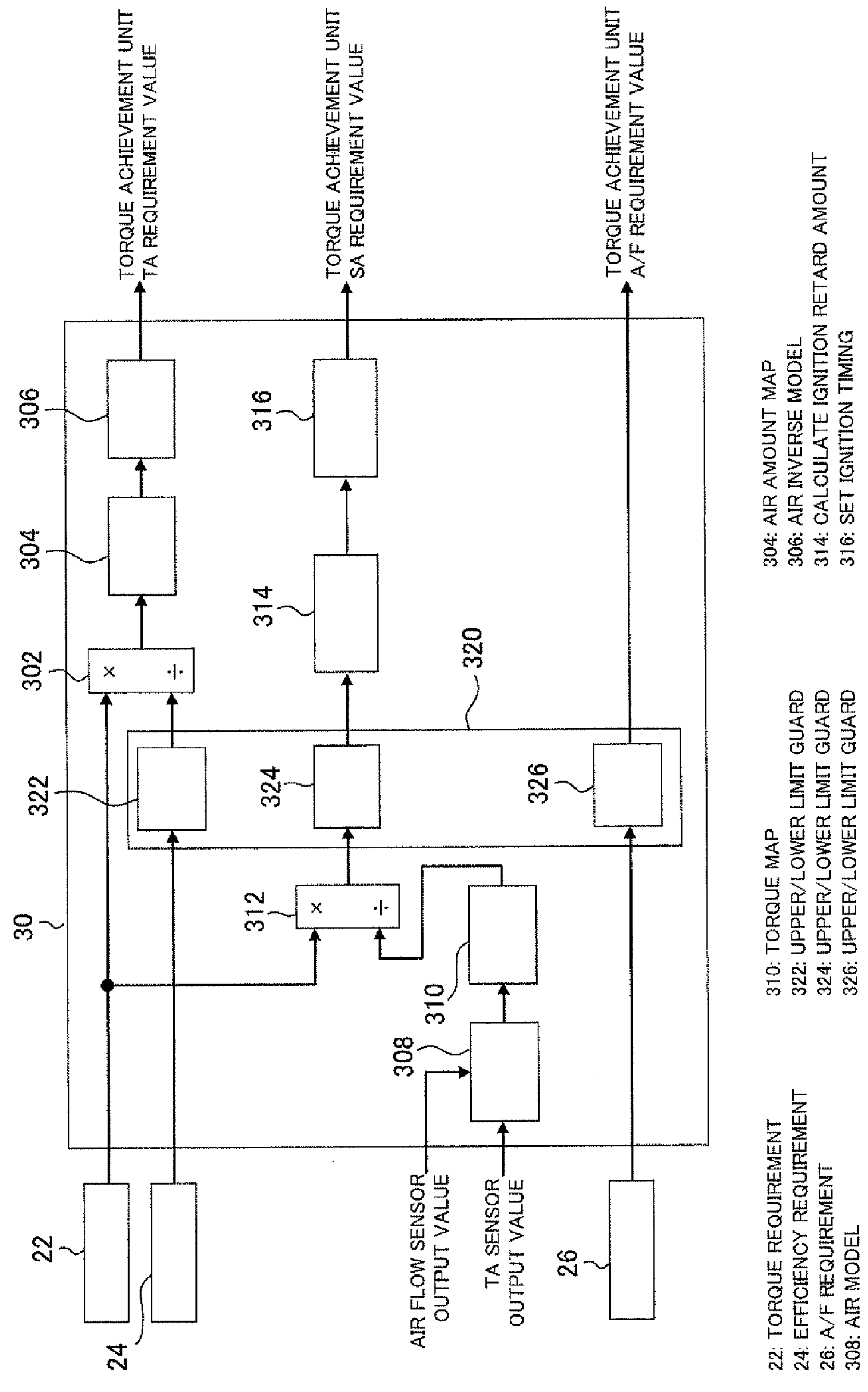
FIG. 4 is a block diagram showing an arrangement of a torque achievement unit according to the first embodiment of the present invention.

To enable an even deeper understanding of the torque achievement unit 30, specific examples will be given below. FIG. 4 is a block diagram showing an arrangement of the torque achievement unit 30, specifically, the engine inverse model. The arrangement and functions of the torque achievement unit 30 will be described with reference to FIGS. 4, and 1 cited earlier.

The torque requirement value outputted from the torque mediatory sub-unit 22 and the efficiency requirement value outputted from the efficiency mediatory sub-unit 24 serve directly as a signal used for throttle valve control. The A/F requirement value outputted from the A/F mediatory sub-unit 26 serves directly as a signal used for fuel injection control. To control operation of the internal combustion engine, a signal used for ignition timing control is also necessary in addition to the foregoing signals and the torque achievement unit 30 also has a function to generate such a signal.

The signal used for the ignition timing control in the control apparatus according to the embodiment is torque efficiency. The torque efficiency is defined as a ratio of the torque requirement value to estimated torque of the internal combustion engine. The torque achievement unit 30 includes, as elements for calculating the torque efficiency, an estimated air amount calculating section 308, an estimated torque calculating section 310, and a torque efficiency calculating section 312.

The estimated air amount calculating section 308 receives an output signal from the throttle valve opening sensor (hereinafter referred to as "TA sensor") and an output signal from the air flow sensor. An actual throttle valve opening can be obtained from the output signal from the TA sensor. An air flow rate inside the intake pipe can be obtained from the output signal from the air flow sensor. The estimated air amount calculating section 308 calculates an air amount estimated to be achievable by the current throttle valve opening (hereinafter referred to as the "estimated air amount") by using an air model. The air model represents a physical model of an intake system that models response of the intake air amount relative to an operation of the throttle valve 2 based on, for example, fluid dynamics. The output signal of the air flow sensor is used as correction data for correcting calculation of the intake air amount performed by using the air model.

The estimated torque calculating section 310 translates the estimated air amount into torque. A torque map is used to translate the estimated air amount into torque. The torque map is a statistical model that shows a relationship between torque and the intake air amount, constituting a multidimensional map having axes of a plurality of parameters including the intake air amount. A value acquired from the current engine information is inputted to each parameter. Ignition timing is, however, optimum ignition timing (of MBT and trace detonation ignition timing, one more on the retard side). The estimated torque calculating section 30 calculates torque translated from the estimated air amount as estimated torque at the optimum ignition timing of the internal combustion engine. This estimated torque is potential torque which the internal combustion engine can output.

The torque efficiency calculating section 312 calculates a ratio between the torque requirement value outputted from the torque mediatory sub-unit 22 and the estimated torque calculated by the estimated torque calculating section 310 as torque efficiency. As will be described later, the throttle valve opening is controlled so as to achieve a corrected torque requirement value that is the torque requirement value increased by being divided by the efficiency requirement value. This is to make an increase in the intake air amount compensate for that part of torque reduced by the efficiency requirement value. Because there is, however, a lag involved in response of an actual intake air amount to a change in the throttle valve opening, actual torque to be outputted (estimated torque) has a response lag relative to a change in the efficiency requirement value. The torque efficiency that is a ratio between the estimated torque and the torque requirement value serves as a parameter for reflecting both the efficiency requirement value and the change in the actual intake air amount in the ignition timing control. In a steady state, in which at least the intake air amount remains constant, theoretically the estimated torque coincides with the corrected torque requirement value and the torque efficiency coincides with the efficiency requirement value.

When the engine requirement value generating unit 20 generates the engine requirement values, no consideration is given to whether or not each of the engine requirement values is practicable in terms of its relationship with other engine requirement values. As a result, depending on the magnitude of each of the engine requirement values, cylinder combustion conditions may exceed a combustion limit, resulting in the internal combustion engine being incapable of running correctly. The torque achievement unit 30 therefore includes an adjusting section 320 that adjusts relationships in size of signals used for control of the internal combustion engine so as to enable a proper operation of the internal combustion engine. The adjusting section 320 corrects a signal having a lower priority relative to one having a higher priority according to a previously established priority. The torque requirement value is the signal that is given top priority and is not corrected. The signal that is given the second higher priority depends on the operating mode of the internal combustion engine. According to this embodiment, the operating mode of the internal combustion engine may be an efficiency preferential mode or an A/F preferential mode. The abovementioned priority is changed according to the operating mode.

The adjusting section 320 includes an efficiency guard sub-section 322, a torque efficiency guard sub-section 324, and an A/F guard sub-section 326. The efficiency guard sub-section 322 limits upper and lower limits of the efficiency requirement value inputted from the efficiency mediatory sub-unit 24, so that the efficiency requirement value can be corrected so as to fall within a range in which the proper operation of the internal combustion engine is enabled. The torque efficiency guard sub-section 324 limits upper and lower limits of the torque efficiency calculated by the torque efficiency calculating section 312, so that the torque efficiency value can be corrected so as to fall within a range in which the proper operation of the internal combustion engine is enabled. The A/F guard sub-section 326 limits upper and lower limits of the A/F requirement value inputted from the A/F mediatory sub-unit 26, so that the A/F requirement value can be corrected so as to fall within a range in which the proper operation of the internal combustion engine is enabled.

Each of the upper and lower limit guard values of the three guard sub-sections 322, 324, and 326 that make up the adjusting section 320 is variable to be changed in a manner of being operatively associated with each other. Specifically, when the operating mode of the internal combustion engine is the efficiency preferential mode, uppermost and lowermost limit values are set in an entire A/F range as the upper and lower limit guard values of the efficiency guard sub-section 322 and the torque efficiency guard sub-section 324. Then, the upper and lower limit guard values of the A/F guard sub-section 326 are set based on torque efficiency after a guarding process performed by the torque efficiency guard sub-section 324. In the A/F preferential mode, on the other hand, uppermost and lowermost limit values are set in an entire efficiency range as the upper and lower limit guard values of the A/F guard sub-section 326. Then, the upper and lower limit guard values of the efficiency guard sub-section 322 and the torque efficiency guard sub-section 324 are set based on the A/F requirement value after a guarding process performed by the A/F guard sub-section 326.

As a result of the foregoing processes, the control amount to be required of each of the actuators 2, 4, and 6, specifically, major signals used for calculation of the torque achievement unit requirement values are the torque requirement value, corrected efficiency requirement value, corrected A/F requirement value, and corrected torque efficiency. The torque achievement unit 30 calculates the torque achievement unit requirement value to be supplied to the throttle valve 2 (hereinafter referred to as "torque achievement unit TA requirement value") based on the torque requirement value and the corrected efficiency requirement value. Additionally, the torque achievement unit 30 calculates the torque achievement unit requirement value to be supplied to the ignition device 4 (hereinafter referred to as "torque achievement unit SA requirement value") based on the corrected torque efficiency. Additionally, the torque achievement unit 30 calculates the corrected A/F requirement value as the torque achievement unit requirement value to be supplied to the fuel injection system 6 (hereinafter referred to as "torque achievement unit A/F requirement value").

For calculation of the torque achievement unit TA requirement value, the torque achievement unit 30 includes a torque requirement value correcting section 302, an air amount requirement value calculating section 304, and a TA requirement value calculating section 306. The torque requirement value and the corrected efficiency requirement value are inputted to the torque requirement value correcting section 302. The torque requirement value correcting section 302 divides the torque requirement value by the corrected efficiency requirement value and outputs the torque requirement value as corrected by efficiency to the air amount requirement value calculating section 304. Whereas the torque requirement value is the requirement value of torque which the internal combustion engine actually outputs, the torque requirement value as corrected by efficiency means a requirement value of torque which the internal combustion engine can potentially output. If the corrected efficiency requirement value is smaller than 1, the division by the corrected efficiency requirement value results in the torque requirement value being increased and the increased, corrected torque requirement value is supplied to the air amount requirement value calculating section 304.

The air amount requirement value calculating section 304 translates the corrected torque requirement value into an intake air amount. An air amount map is used for translating the corrected torque requirement value into the intake air amount. The air amount map is a multidimensional map having axes of a plurality of parameters including torque, in which various types of operating conditions that affect the relationship between torque and the intake air amount, such as ignition timing, engine speed, and A/F, are used as parameters. Values acquired from the current engine information are inputted to these parameters. The ignition timing is, however, optimum ignition timing. The air amount requirement value calculating section 304 calculates torque translated from the corrected torque requirement value as the requirement value of the intake air amount.

The TA requirement value calculating section 306 calculates the throttle valve opening for achieving the air amount requirement value by using an inverse model of the air model (hereinafter referred to as "air inverse model"). In the air inverse model, operating conditions that affect the relationship between the air amount and the throttle valve opening, such as valve timing and intake air temperature, can be set as parameters. Values acquired from the engine information are inputted in these parameters. The TA requirement value calculating section 306 outputs the throttle valve opening as translated from the air amount requirement value as the torque achievement unit TA requirement value.

In addition, the torque achievement unit 30 further includes an ignition retard amount calculating section 314 and an SA requirement value calculating section 316 for calculating the torque achievement unit SA requirement value. The corrected torque efficiency is inputted to the ignition retard amount calculating section 314. The ignition retard amount calculating section 314 calculates a retard amount relative to the optimum ignition timing by using the corrected torque efficiency. A map is used for calculating the retard amount. The map is a multidimensional map having axes of a plurality of parameters including torque efficiency, in which various types of operating conditions that affect determination of the ignition timing, such as the engine speed, A/F, and the air amount, can be set as parameters. Values acquired from the current engine information are inputted to these parameters. The smaller the torque efficiency, the greater a value is set for the ignition retard amount in this map.

The SA requirement value calculating section 316 adds the ignition retard amount calculated by the ignition retard amount calculating section 314 to the optimum ignition timing. The optimum ignition timing is calculated based on the operating conditions of the internal combustion engine. The SA requirement value calculating section 316 outputs the final ignition timing obtained as the torque achievement unit SA requirement value.

Arrangements of the torque achievement unit 30 have been described. Referring back to FIG. 1, the actuator direct requirement value generating unit 40 and the selection changeover unit 50 will be described below. The control apparatus according to this embodiment is characterized, for one thing, by the actuator direct requirement value generating unit 40 and the selection changeover unit 50 the control apparatus has.

The actuator direct requirement value generating unit 40 has a function of generating the control amount to be directly required of each of the actuators 2, 4, and 6 (hereinafter referred to as "actuator direct requirement value") based on the performance requirement issued from the performance requirement generating unit 10, without having the above-mentioned torque achievement unit 30 intervening therebetween. This function is achieved by a TA direct requirement value calculating sub-unit 42, an SA direct requirement value calculating sub-unit 44, and an A/F direct requirement value calculating sub-unit 46 that constitute the actuator direct requirement value generating unit 40.

The performance requirements quantified by the physical quantities of the second group, of those issued by the performance requirement generating unit 10, are supplied to the actuator direct requirement value generating unit 40. Of these, the performance requirements quantified by the physical quantities that directly specify the operation of the throttle valve 2 are inputted to the TA direct requirement value calculating sub-unit 42; the performance requirements quantified by the physical quantities that directly specify the operation of the ignition device 4 are inputted to the SA direct requirement value calculating sub-unit 44; and the performance requirements quantified by the physical quantities that directly specify the operation of the fuel injection system 6 are inputted to the A/F direct requirement value calculating sub-unit 46.

The TA direct requirement value calculating sub-unit 42 calculates an actuator direct requirement value to be supplied to the throttle valve 2 (hereinafter referred to as a "TA direct requirement value") based on the performance requirements inputted thereto. The SA direct requirement value calculating sub-unit 44 calculates an actuator direct requirement value to be supplied to the ignition device 4 (hereinafter referred to as an "SA direct requirement value") based on the performance requirements inputted thereto. The A/F direct requirement value calculating sub-unit 46 calculates an actuator direct requirement value to be supplied to the fuel injection system 6 (hereinafter referred to as an "A/F direct requirement value") based on the performance requirements inputted thereto.

The performance requirement generating unit 10 issues a performance requirement to the actuator direct requirement value generating unit 40, only if a predetermined condition during, for example, starting of the internal combustion engine is met. When such a condition is met, the actuator direct requirement value generating unit 40 also generates an actuator direct requirement value in parallel with the torque achievement unit requirement value that is being calculated in the torque achievement unit 30. Specifically, there are two types of control amounts that are required of the actuators 2, 4, and 6. Understandably, none of the actuators 2, 4, and 6 can operate on two types of control amounts at the same time. This makes it necessary to select the control of the actuators 2, 4, and 6 between that according to the torque achievement unit requirement value and that according to the actuator direct requirement value. The selection changeover unit 50 to be described below is provided to achieve that purpose.

Each of the torque achievement unit requirement values and the actuator direct requirement values is inputted to the selection changeover unit 50. The selection changeover unit 50 selects only one of the two types of values and supplies the same to each of the actuators 2, 4, and 6. The selection changeover unit 50 includes three changeover sub-units 52, 54, and 56 and a changeover commanding sub-unit 58. The changeover sub-unit 52 selects the requirement value to be supplied to the throttle valve 2. The torque achievement unit TA requirement value and the TA direct requirement value are inputted to the changeover sub-unit 52. The changeover sub-unit 54 selects the requirement value to be supplied to the ignition device 4. The torque achievement unit SA requirement value and the SA direct requirement value are inputted to the changeover sub-unit 54. The changeover sub-unit 56 selects the requirement value to be supplied to the fuel injection system 6. The torque achievement unit A/F requirement value and the A/F direct requirement value are inputted to the changeover sub-unit 56.

Each of the changeover sub-units 52, 54, and 56 selects a requirement value on receipt of a command from the changeover commanding sub-unit 58. The changeover commanding sub-unit 58 determines which, whether the torque achievement unit requirement value or the actuator direct requirement value, should be supplied to the actuators 2, 4, and 6 based on the engine information. The engine information that represents an operating state or an operating condition of the internal combustion engine is required for calculating the torque achievement unit requirement value in the engine inverse model of the torque achievement unit 30. Use of the engine information allows a prediction to be made of a situation in which the control according to the torque achievement unit requirement value is advantageous or disadvantageous. Making a decision of the selection based on the engine information enables a precise selection of the more advantageous control. The changeover commanding sub-unit 58 commands each of the changeover sub-units 52, 54, and 56 to change the control according to the decision made based on the engine information.

The changeover commanding sub-unit 58 makes a decision based on the engine information in, for example, the following manner. First of all, the changeover commanding sub-unit 58 selects the supply of the torque achievement unit requirement value by default. Only if it is determined from the engine information that a predetermined direct requirement value supply condition is met, the changeover commanding sub-unit 58 commands each of the changeover sub-units 52, 54, and 56 to change the control so as to supply each of the actuators 2, 4, and 6 with the actuator direct requirement value. If the predetermined direct requirement value supply condition is no longer met, the changeover commanding sub-unit 58 commands each of the changeover sub-units 52, 54, and 56 to change the control so as to supply each of the actuators 2, 4, and 6 with the torque achievement unit requirement value.

The abovementioned direct requirement value supply condition is included in the conditions when the performance requirement generating unit 10 issues a performance requirement to the actuator direct requirement value generating unit 40. Herein, the direct requirement value supply condition is a case in which the current operating state or operating condition of the internal combustion engine, such as at starting of the internal combustion engine and during operation in the stratified combustion mode, is not included in a condition of making the engine inverse model hold true. In such a case, the engine inverse model cannot be used for calculating the control amount of the actuator. For example, in this embodiment, the engine inverse model is designed based on homogeneous combustion, so that the engine inverse model no longer holds true when the stratified combustion is selected for the combustion mode. In addition, because air already exists in the intake pipe at starting, the air model that models response of the intake air amount relative to the operation of the throttle valve 2, or an inverse model thereof, does not hold true. This disables accurate calculations required for finding the control amount, which makes the entire engine inverse model not holding true. In such cases, precise operations of the actuators 2, 4, and 6 are guaranteed under a condition, in which the engine inverse model does not hold true, by selecting the control according to the actuator direct requirement value instead of the control according to the torque achievement unit requirement value.

The changeover commanding sub-unit 58 determines a case, in which reliability of the engine information acquired is low, as one of the direct requirement value supply conditions. If the reliability of the engine information acquired is low, accuracy of the torque achievement unit requirement value calculated by using the engine information having low reliability is also degraded. Example cases of the low reliability of engine information include that: a sensor for acquiring the engine information is not activated; the subject being sensed by the sensor is not stabilized; and calculating conditions for calculating the engine information are not met. In such cases, selecting the control according to the actuator direct requirement value instead of the control according to the torque achievement unit requirement value will prevent the low reliability of the engine information from adversely affecting the operations of the actuators 2, 4, and 6.

One of the advantages the control apparatus according to this embodiment offers is that the control apparatus is adapted, as described above, to select either the control according to the torque achievement unit requirement value or the control according to the actuator direct requirement value for controlling the actuators 2, 4, and 6. If the torque achievement unit requirement value calculated by using the engine inverse model is used, each of the actuators 2, 4, and 6 can be operated in a mutually coordinated manner to eventually achieve the requirements relating to the various types of performance of the internal combustion engine. If, as described above, the reliability of the engine information is low or the operating state or operating condition of the internal combustion engine is not included in the condition that makes the engine inverse model hold true, however, accuracy of the torque achievement unit requirement value is greatly reduced. The control according to the torque achievement unit requirement value has such a disadvantage and the control according to the actuator direct requirement value compensates for the disadvantage. The control according to the actuator direct requirement value can make the actuators 2, 4, and 6 perform a predetermined operation precisely based on the performance requirement without being affected by the operating state or operating condition of the internal combustion engine. Specifically, according to the control apparatus of the embodiment, either the control according to the torque achievement unit requirement value or the control according to the actuator direct requirement value, whichever is more advantageous can be selected, so that the requirement relating to performance of the internal combustion engine can be precisely reflected in the control amount of each of the actuators 2, 4, and 6.

The first embodiment of the present invention has been described. The first embodiment embodies first, second, third, and fourth aspects of the present invention. More specifically, in the arrangement shown in FIG. 1, the engine requirement value generating unit 20 corresponds to "engine requirement value generating means" in the first aspect of the present invention. The information generating source 12 corresponds to "engine information acquiring means" in the first aspect of the present invention. The torque achievement unit 30 corresponds to "actuator requirement value calculating means" in the first aspect of the present invention. The actuator direct requirement value generating unit 40 corresponds to "actuator direct requirement value generating means" in the first aspect of the present invention. The changeover sub-units 52, 54, and 56 correspond to "changeover means" in the first aspect of the present invention. The changeover commanding sub-unit 58 corresponds to "changeover commanding means" in the second to fourth aspects of the present invention.

Second Embodiment

Figure 5:
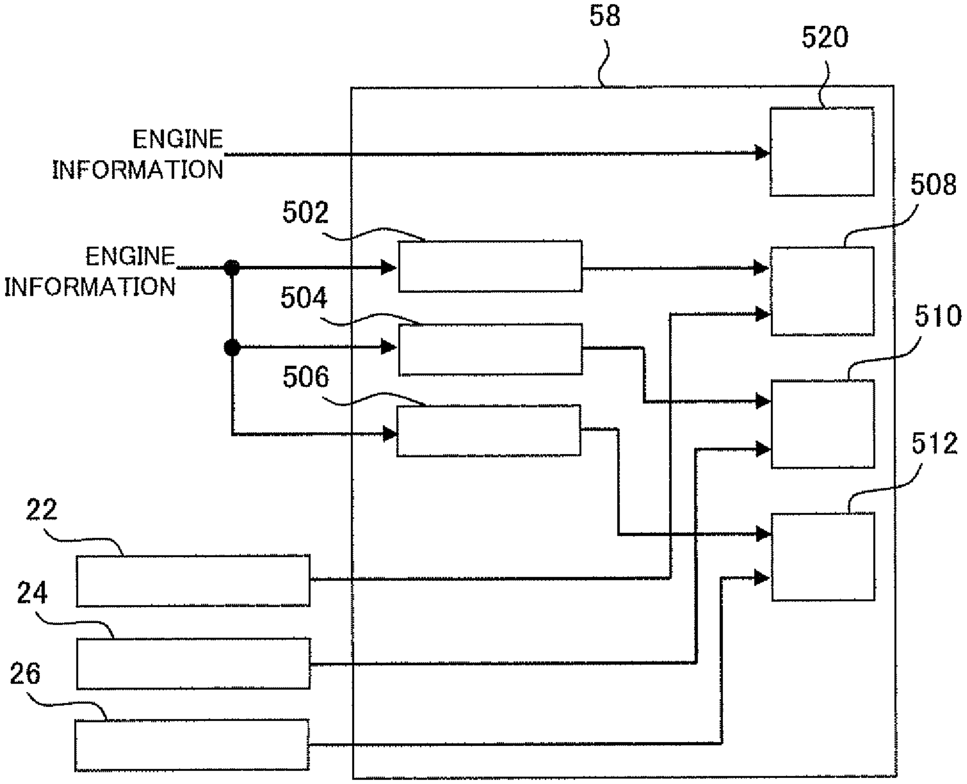
FIG. 5 is a block diagram showing an arrangement of a changeover commanding sub-unit according to a second embodiment of the present invention.

A second embodiment of the present invention will be described below with reference to FIGS. 1, 5, and 6.

A general arrangement of a control apparatus according to this embodiment is the same as that of the first embodiment as shown in the block diagram of FIG. 1. The control apparatus according to this embodiment differs from the control apparatus of the first embodiment in the function of the changeover commanding sub-unit 58 that serves as one of elements constituting the control apparatus. FIG. 5 is a block diagram showing an arrangement of the changeover commanding sub-unit 58 according to this embodiment. The arrangement and functions of the changeover commanding sub-unit 58 that characterize this embodiment will be described below with reference to FIGS. 1 and 5.

The changeover commanding sub-unit 58 according to this embodiment is functionally characterized in that a torque step occurring when the control of the actuators 2, 4, and 6 is changed from the control according to the actuator direct requirement value to the control according to the torque achievement unit requirement value can be inhibited. For example, when the control according to the actuator direct requirement value is performed as the control at starting of the internal combustion engine, the control is changed to the control according to the torque achievement unit requirement value after calculation using an air model or an air inverse model is possible. At this time, if there is any difference between a torque, efficiency, or A/F value achieved by the actuator direct requirement value and a torque, efficiency, or A/F value achieved anew by the torque achievement unit requirement value, the changeover involves discontinuous fluctuations in the operation of the internal combustion engine. If there is difference in the torque achievement value, in particular, the changeover involves a torque step which reduces drivability. According to the arrangement of the changeover commanding sub-unit 58 to be described below, such a problem during changeover can be prevented.

The changeover commanding sub-unit 58 according to this embodiment includes a selecting section 520. The selecting section 520 selects either the control according to the actuator direct requirement value or the control according to the torque achievement unit requirement value based on the engine information and commands the changeover sub-units 52, 54, and 56 to change to the selected control. Specifically, the function of the changeover commanding sub-unit 58 described with reference to the first embodiment is consolidated in the selecting section 520.

In addition, the changeover commanding sub-unit 58 according to this embodiment includes, as means for acquiring torque, efficiency, and A/F values which the internal combustion engine actually achieves, a torque achievement value calculating section 502, an efficiency achievement value calculating section 504, and an A/F achievement value calculating section 506. These engine achievement value calculating sections 502, 504, and 506 calculate respective engine achievement values (torque achievement value, efficiency achievement value, A/F achievement value) using the engine information supplied from the information generating source 12. For example, the A/F achievement value may be calculated by using information, such as an output signal of the air-fuel ratio sensor. The efficiency achievement value may be calculated by using information, such as ignition timing. Similarly, the torque achievement value may be calculated by using information, such as the throttle valve opening, an output signal of the air flow sensor, the engine speed, A/F, and the ignition timing.

The changeover commanding sub-unit 58 according to this embodiment further includes three difference determining sections 508, 510, and 512. The difference determining section 508 determines if a difference between the torque achievement value calculated by the torque achievement value calculating section 502 and the torque requirement value outputted from the torque mediatory sub-unit 22 falls within a predetermined acceptable range. The difference determining section 510 determines if a difference between the efficiency achievement value calculated by the efficiency achievement value calculating section 504 and the efficiency requirement value outputted from the efficiency mediatory sub-unit 24 falls within a predetermined acceptable range. The difference determining section 512 determines if a difference between the A/F achievement value calculated by the A/F achievement value calculating section 506 and the A/F requirement value outputted from the A/F mediatory sub-unit 26 falls within a predetermined acceptable range. Each of the difference determining sections 508, 510, and 512 determines if the difference falls within the acceptable range when the control according to the actuator direct requirement value is selected by the selecting section 520. The decision made by each of the difference determining sections 508, 510, and 512 is reflected in the selection changeover performed by the selecting section 520.

The selecting section 520 quantifies the timing of changeover by using the decisions supplied from the difference determining sections 508, 510, and 512. When each and every difference between the engine achievement value (torque achievement value, efficiency achievement value, and A/F achievement value) and the engine requirement value (torque requirement value, efficiency requirement value, and A/F requirement value) falls within the acceptable range in the difference determining sections 508, 510, and 512, the selecting section 520 commands the changeover sub-units 52, 54, and 56 to change from the control according to the actuator direct requirement value to the control according to the torque achievement unit requirement value. The changeover command issued at such timing ensures proper shift to the control according to the torque achievement unit requirement value without allowing the operation of the internal combustion engine to fluctuate discontinuously.

According to the arrangement and the functions of the changeover commanding sub-unit 58 as described above, the following changeover control can be performed in terms of selection changeover of the control method of the actuators 2, 4, and 6. FIG. 6 is a flowchart showing a changeover control routine performed by the changeover commanding sub-unit 58 according to this embodiment.

Figure 6:
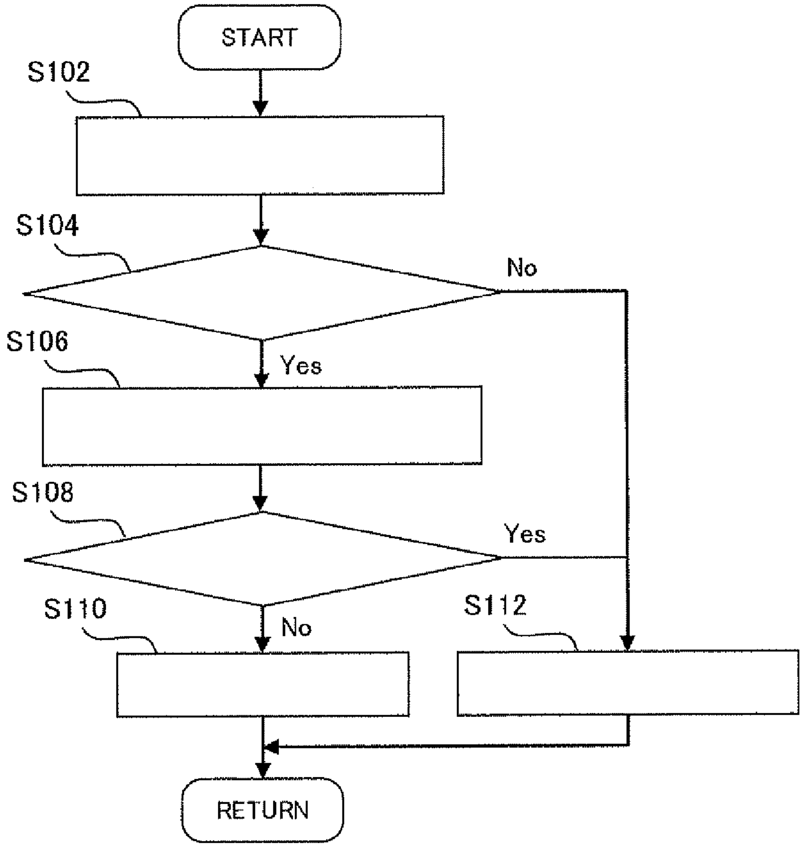
FIG. 6 is a flowchart showing a changeover control routine performed in the second embodiment of the present invention.

In step S102, the first step of the routine shown in FIG. 6, the torque requirement value, the efficiency requirement value, and the A/F requirement value are acquired from the engine requirement value generating unit 20.

In step S104, it is determined whether or not the internal combustion engine is operated in a direct requirement range. The direct requirement range is an operating range, in which the control according to the actuator direct requirement value is more advantageous than the control according to the torque achievement unit requirement value. Operating ranges at starting of the internal combustion engine and by stratified combustion are included in this direct requirement range. If the internal combustion engine is not being operated in the direct requirement range, operation proceeds to step S112, in which the selecting section 520 selects the control according to the torque achievement unit requirement value.

If the internal combustion engine is being operated in the direct requirement range, operation proceeds to step S106. In step S106, the engine achievement value calculating sections 502, 504, and 506 calculate the torque achievement value, the efficiency achievement value, and the A/F achievement value, respectively, achieved by the actuator direct requirement value.

In subsequent step S108, the difference determining sections 508, 510, and 512 determine differences between the engine requirement values acquired in step S102 and the engine achievement values calculated in step S106. If, as a result, any of the differences is found not to fall within the acceptable range, operation proceeds to step S110 and the control according to the actuator direct requirement value is directly selected.

If, as a result, all of the differences are found to fall within the acceptable range, operation proceeds to step S112. In step S112, the selecting section 520 selects the control according to the torque achievement unit requirement value and commands the changeover sub-units 52, 54, and 56 to change to the selected control.

As described above, in the control apparatus according to this embodiment, the condition for changeover is that the difference between each engine achievement value achieved by the control according to the actuator direct requirement value and each engine requirement value that serves as the basis for calculating the torque achievement unit requirement value falls within the acceptable range. Continuity in torque, efficiency, and A/F before and after the changeover can therefore be maintained. This helps prevent discontinuous fluctuations in the operation of the internal combustion engine occurring in conjunction with the changeover from occurring, so that torque fluctuations that degrade drivability can be prevented from occurring.

The second embodiment of the present invention has been described. The second embodiment embodies first, second, third, fourth, fifth, and sixth aspects of the present invention. More specifically, in the arrangement shown in FIG. 5, the torque achievement value calculating section 502, the efficiency achievement value calculating section 504, and the A/F achievement value calculating section 506 correspond to "engine achievement value acquiring means" in the fifth and sixth aspects of the present invention. The selecting section 520 and the difference determining sections 508, 510, and 512 constitute "changeover commanding means" in the fifth aspect of the present invention. Correspondence of the second embodiment to the first, second, third, and fourth aspects of the present invention is the same as that of the first embodiment.

Additionally, the second embodiment includes an aspect that differs any of the first through 24th aspects of the present invention.

The aspect is: "a control apparatus for an internal combustion engine whose operation is controlled by a single or multiple actuators, the control apparatus comprising: engine requirement value acquiring means for acquiring a single or multiple requirement values representing a single or multiple predetermined physical quantities (hereinafter referred to as an "engine requirement value") that determine an operation of the internal combustion engine; engine information acquiring means for acquiring information on a current operating state or operating condition of the internal combustion engine (hereinafter referred to as "engine information"); actuator requirement value calculating means having an engine inverse model that derives, from each value representing a corresponding one of the single or multiple predetermined physical quantities, a control amount of each of the single or multiple actuators for achieving the values in the internal combustion engine, the actuator requirement value calculating means calculating a control amount to be required of each of the single or multiple actuators (hereinafter referred to as an "actuator requirement value") by inputting each engine requirement value and the engine information to the engine inverse model; actuator direct requirement value acquiring means for acquiring a control amount to be directly required of each of the single or multiple actuators (hereinafter referred to as an "actuator direct requirement value"); changeover means for changing control of the single or multiple actuators between that according to the actuator requirement value and that according to the actuator direct requirement value; engine achievement value acquiring means for acquiring a value of the single or multiple predetermined physical quantities achieved by the internal combustion engine (hereinafter referred to as an "engine achievement value"); and changeover commanding means for commanding the changeover means to change the control from that according to the actuator direct requirement value to that according to the actuator requirement value when, while the single or multiple actuators are being controlled according to the actuator direct requirement value, a difference of the engine achievement value from the engine requirement value for each of the single or multiple predetermined physical quantities falls within an acceptable range".

Third Embodiment

Figure 7:
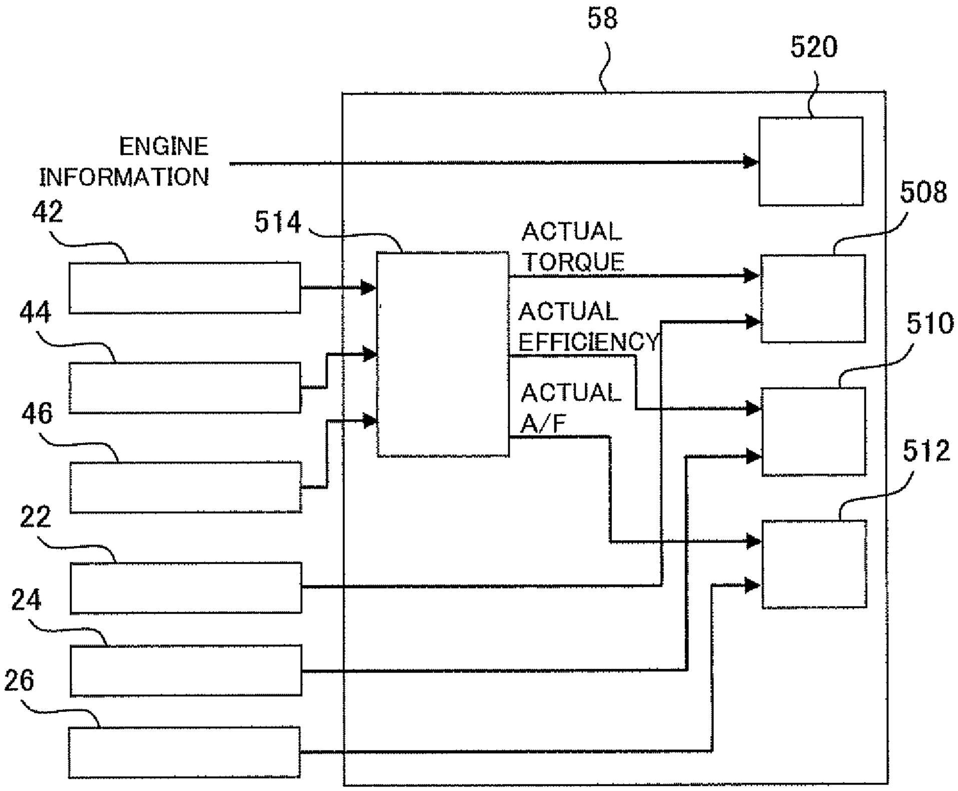
FIG. 7 is a block diagram showing an arrangement of a changeover commanding sub-unit according to a third embodiment of the present invention.

A third embodiment of the present invention will be described below with reference to FIGS. 1 and 7.

A general arrangement of a control apparatus according to this embodiment is the same as that of the first embodiment as shown in the block diagram of FIG. 1. The control apparatus according to this embodiment differs from the control apparatus of the first embodiment in the function of the changeover commanding sub-unit 58 that serves as one of elements constituting the control apparatus. FIG. 7 is a block diagram showing an arrangement of the changeover commanding sub-unit 58 according to this embodiment. The arrangement and functions of the changeover commanding sub-unit 58 that characterize this embodiment will be described below with reference to FIGS. 1 and 7.

The changeover commanding sub-unit 58 according to this embodiment shares the same functional characteristics with the changeover commanding sub-unit 58 according to the second embodiment, except that the changeover commanding sub-unit 58 according to this embodiment has an arrangement for acquiring each engine achievement value obtained through the control according to the actuator direct requirement value, which is different from that of the changeover commanding sub-unit 58 according to the second embodiment. Referring to FIG. 7, the changeover commanding sub-unit 58 according to this embodiment includes an engine model 514. The engine model 514 models the internal combustion engine and has a normal-inverse relationship with the engine inverse model of the torque achievement unit 30. By inputting each actuator direct requirement value in the engine model 514, therefore, the corresponding engine achievement value achieved by the actuator direct requirement value can be accurately estimated and calculated.

The changeover commanding sub-unit 58 according to this embodiment further includes a selecting section 520 and difference determining sections 508, 510, and 512, in addition to the engine model 514. These elements have the same functions as equivalent elements of the second embodiment and descriptions of the functions will be omitted. The TA direct requirement value calculating sub-unit 42, the SA direct requirement value calculating sub-unit 44, and the A/F direct requirement value calculating sub-unit 46 input respective actuator direct requirement values to the engine model 514. Each of the engine achievement values calculated by the engine model 514 is inputted to the corresponding one of the difference determining sections 508, 510, and 512.

The third embodiment of the present invention has been described. The third embodiment embodies first, second, third, fourth, fifth, and seventh aspects of the present invention. More specifically, in the arrangement shown in FIG. 7, the engine model 514 corresponds to "engine achievement value acquiring means" in the fifth and seventh aspects of the present invention. The selecting section 520 and the difference determining sections 508, 510, and 512 constitute "changeover commanding means" in the fifth aspect of the present invention. Correspondence of the third embodiment to the first, second, third, and fourth aspects of the present invention is the same as that of the first embodiment.

Fourth Embodiment

Figure 8:
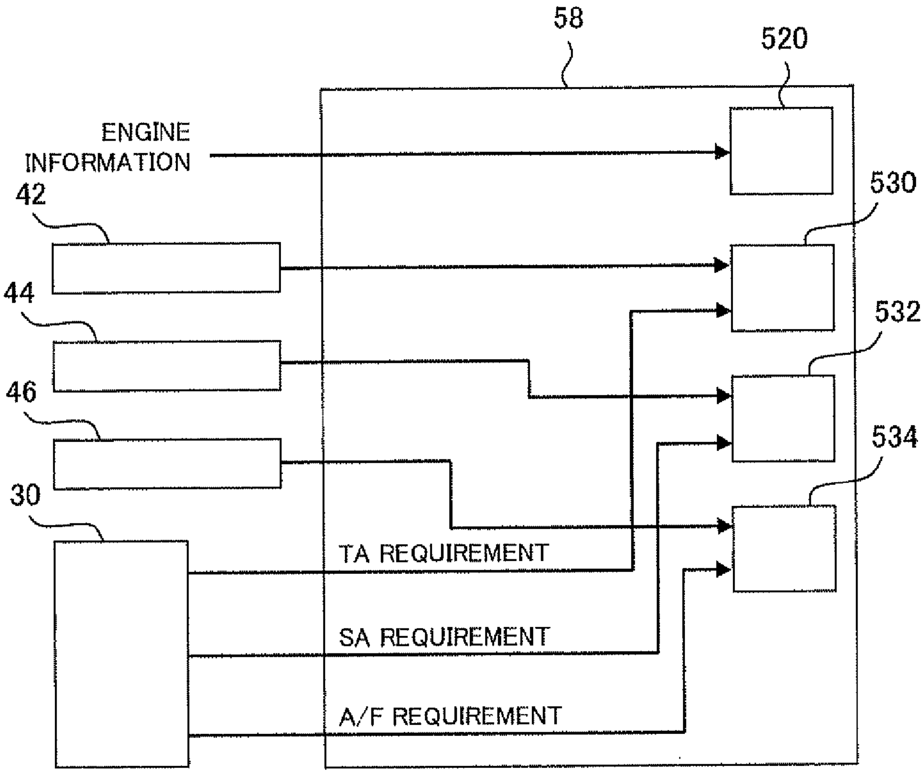
FIG. 8 is a block diagram showing an arrangement of a changeover commanding sub-unit according to a fourth embodiment of the present invention.

A fourth embodiment of the present invention will be described below with reference to FIGS. 1, 8, and 9.

A general arrangement of a control apparatus according to this embodiment is the same as that of the first embodiment as shown in the block diagram of FIG. 1. The control apparatus according to this embodiment differs from the control apparatus of the first embodiment in the function of the changeover commanding sub-unit 58 that serves as one of elements constituting the control apparatus. FIG. 8 is a block diagram showing an arrangement of the changeover commanding sub-unit 58 according to this embodiment. The arrangement and functions of the changeover commanding sub-unit 58 that characterize this embodiment will be described below with reference to FIGS. 1 and 8.

The changeover commanding sub-unit 58 according to this embodiment shares the same functional characteristics with the changeover commanding sub-unit 58 according to the first or second embodiment, except that a different condition applies to the selection changeover from the control according to the actuator direct requirement value to the control according to the torque achievement unit requirement value in the changeover commanding sub-unit 58 according to this embodiment, from that in the changeover commanding sub-unit 58 according to the first or second embodiment. In this embodiment, the condition for the changeover is that the difference between the actuator direct requirement value and the torque achievement unit requirement value falls within an acceptable range. If there is a difference between the actuator direct requirement value and the torque achievement unit requirement value before and after the changeover, the operation of the actuators 2, 4, and 6 is discontinuous and, as a result, the operation of the internal combustion engine may fluctuate discontinuously, thus producing a torque step.

The changeover commanding sub-unit 58 according to this embodiment includes a selecting section 520 and three difference determining sections 530, 532, and 534. The difference determining section 530 determines if a difference between the TA direct requirement value calculated by the TA direct requirement value calculating sub-unit 42 and the torque achievement unit TA requirement value calculated by the torque achievement unit 30 falls within a predetermined acceptable range. The difference determining section 532 determines if a difference between the SA direct requirement value calculated by the SA direct requirement value calculating sub-unit 44 and the torque achievement unit SA requirement value calculated by the torque achievement unit 30 falls within a predetermined acceptable range. The difference determining section 534 determines if a difference between the A/F direct requirement value calculated by the A/F direct requirement value calculating sub-unit 46 and the torque achievement unit A/F requirement value calculated by the torque achievement unit 30 falls within a predetermined acceptable range. The decision made by each of the difference determining sections 530, 532, and 534 is reflected in the selection changeover performed by the selecting section 520.

The selecting section 520 quantifies the timing of changeover by using the decisions supplied from the difference determining sections 530, 532, and 534. When each and every difference between the actuator direct requirement value and the torque achievement unit requirement value falls within the acceptable range in the difference determining sections 530, 532, and 534, the selecting section 520 commands each of the changeover sub-units 52, 54, and 56 to change from the control according to the actuator direct requirement value to the control according to the torque achievement unit requirement value. The changeover command issued at such timing ensures proper shift to the control according to the torque achievement unit requirement value without allowing the operation of each of the actuators 2, 4, and 6 to be discontinuous.

According to the arrangement and the functions of the changeover commanding sub-unit 58 as described above, the following changeover control can be performed in terms of selection changeover of the control method of the actuators 2, 4, and 6. FIG. 9 is a flowchart showing a changeover control routine performed by the changeover commanding sub-unit 58 according to this embodiment.

In step S202, the first step of the routine shown in FIG. 9, the TA direct requirement value, the SA direct requirement value, and the A/F direct requirement value are acquired from the actuator direct requirement value generating unit 40.

In step S204, it is determined whether or not the internal combustion engine is operated in the direct requirement range. The direct requirement range is as described with reference to the second embodiment. If the internal combustion engine is not being operated in the direct requirement range, operation proceeds to step S212, in which the selecting section 520 selects the control according to the torque achievement unit requirement value.

If the internal combustion engine is being operated in the direct requirement range, operation proceeds to step S206. In step S206, the torque achievement unit TA requirement value, the torque achievement unit SA requirement value, and the torque achievement unit A/F requirement value calculated by the torque achievement unit 30 are obtained.

In subsequent step S208, the difference determining sections 530, 532, and 534 determine differences between the actuator direct requirement values acquired in step S202 and the torque achievement unit requirement values acquired in step S206. If, as a result, any of the differences is found not to fall within the acceptable range, operation proceeds to step S210 and the control according to the actuator direct requirement value is directly selected.

If, as a result, all of the differences are found to fall within the acceptable range, operation proceeds to step S212. In step S212, the selecting section 520 selects the control according to the torque achievement unit requirement value and commands the changeover sub-units 52, 54, and 56 to change to the selected control.

As described above, in the control apparatus according to this embodiment, the condition for the changeover is that the difference between the torque achievement unit requirement value and the actuator direct requirement value falls within the acceptable range for each of the actuators 2, 4, and 6. Continuity in the operation of the actuators 2, 4, and 6 before and after the changeover can therefore be maintained. This helps prevent discontinuous fluctuations in the operation of the actuators 2, 4, and 6 occurring in conjunction with the changeover from occurring, so that torque fluctuations that degrade drivability can be prevented from occurring.

The fourth embodiment of the present invention has been described. The fourth embodiment embodies first, second, third, fourth, and eighth aspects of the present invention. More specifically, in the arrangement shown in FIG. 8, the selecting section 520 and the difference determining sections 530, 532, and 534 constitute "changeover commanding means" in the eighth aspect of the present invention. Correspondence of the fourth embodiment to the first, second, third, and fourth aspects of the present invention is the same as that of the first embodiment.

Additionally, the fourth embodiment includes an aspect that differs any of the first through 24th aspects of the present invention.

The aspect is: "a control apparatus for an internal combustion engine whose operation is controlled by a single or multiple actuators, the control apparatus comprising: engine requirement value acquiring means for acquiring a single or multiple requirement values representing a single or multiple predetermined physical quantities (hereinafter referred to as an "engine requirement value") that determine an operation of the internal combustion engine; engine information acquiring means for acquiring information on a current operating state or operating condition of the internal combustion engine (hereinafter referred to as "engine information"); actuator requirement value calculating means having an engine inverse model that derives, from each value representing a corresponding one of the single or multiple predetermined physical quantities, a control amount of each of the multiple actuators for achieving the values in the internal combustion engine, the actuator requirement value calculating means calculating a control amount to be required of each of the single or multiple actuators (hereinafter referred to as an "actuator requirement value") by inputting each engine requirement value and the engine information to the engine inverse model; actuator direct requirement value acquiring means for acquiring a control amount to be directly required of each of the single or multiple actuators (hereinafter referred to as an "actuator direct requirement value"); changeover means for changing control of the single or multiple actuators between that according to the actuator requirement value and that according to the actuator direct requirement value; and changeover commanding means for commanding the changeover means to change the control from that according to the actuator direct requirement value to that according to the actuator requirement value when, while the single or multiple actuators are being controlled according to the actuator direct requirement value, a difference of the actuator requirement value from the actuator direct requirement value for each of the single or multiple actuators falls within an acceptable range".

Fifth Embodiment

A fifth embodiment of the present invention will be described below with reference to FIGS. 10 through 13.

Figure 10:
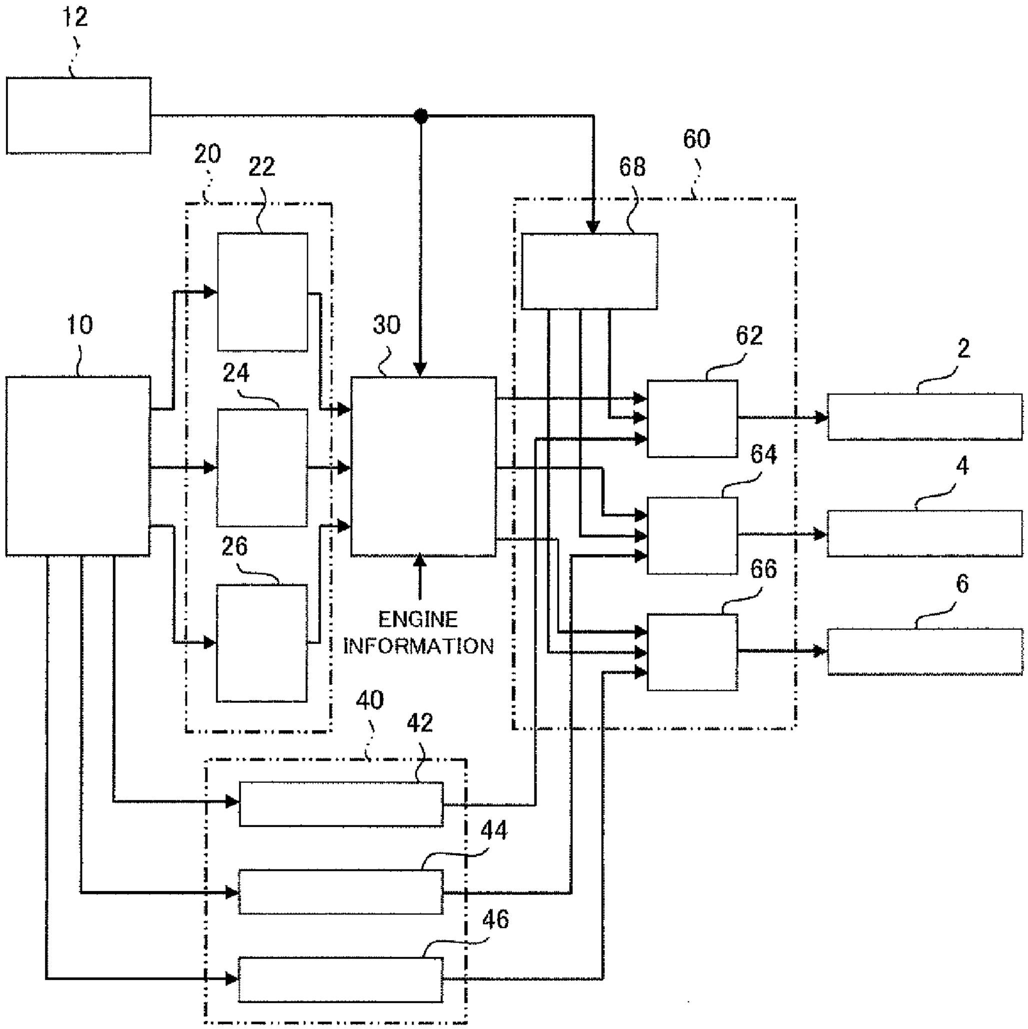
FIG. 10 is a block diagram showing an arrangement of a control apparatus for an internal combustion engine according to a fifth embodiment of the present invention.

A control apparatus according to this embodiment is arranged as shown in a block diagram of FIG. 10. In the control apparatus shown in FIG. 10, like reference numerals are used to identify like elements as those of the control apparatus shown in FIG. 1. In the following, descriptions for common elements as those found in the control apparatus of FIG. 1 will be omitted or simplified and arrangements unique to this embodiment will be focused.

The control apparatus shown in FIG. 10 replaces the selection changeover unit 50 of the control apparatus shown in FIG. 1 with a selection changeover unit 60. Specifically, the control apparatus according to this embodiment is characterized by the selection changeover unit 60. The selection changeover unit 60 according to this embodiment includes three changeover sub-units 62, 64, and 66 and a changeover commanding sub-unit 68. The changeover sub-unit 62 selects the requirement value to be supplied to the throttle valve 2. The torque achievement unit TA requirement value and the TA direct requirement value are inputted to the changeover sub-unit 62. The changeover sub-unit 64 selects the requirement value to be supplied to the ignition device 4. The torque achievement unit SA requirement value and the SA direct requirement value are inputted to the changeover sub-unit 64. The changeover sub-unit 66 selects the requirement value to be supplied to the fuel injection system 6. The torque achievement unit A/F requirement value and the A/F direct requirement value are inputted to the changeover sub-unit 66.

Each of the changeover sub-units 62, 64, and 66 selects a requirement value on receipt of a command from the changeover commanding sub-unit 68. It should be noted that, while the changeover commanding sub-unit 58 commands the changeover sub-units 52, 54, and 56 to select the value collectively in the control apparatus shown in FIG. 1, the changeover commanding sub-unit 68 commands each of the changeover sub-units 62, 64, and 66 to select the value individually in the control apparatus of this embodiment. In this embodiment, control of each of the actuators 2, 4, and 6 is individually selected between the control according to the torque achievement unit requirement value and the control according to the actuator direct requirement value.

Figures 11, 12:
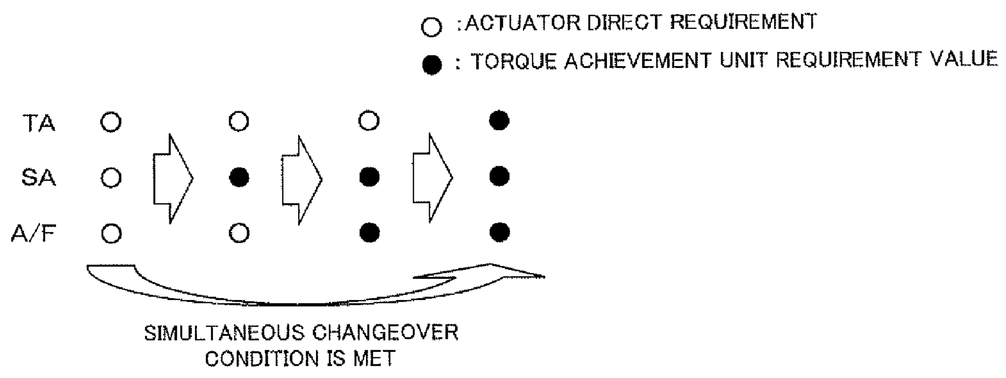
FIG. 11 is a chart showing a combination of controls by actuator direct requirement values selectable in the fifth embodiment of the present invention.
FIG. 12 is a diagram showing steps through which control is changed from that according to the actuator direct requirement values to that according to torque achievement unit requirement values according to the fifth embodiment of the present invention.

Either the control according to the torque achievement unit requirement value or the control according to the actuator direct requirement value is selected individually for each of the actuators 2, 4, and 6. This permits selection of a more advantageous control for each of the actuators 2, 4, and 6. FIG. 11 is a chart showing a combination of controls by actuator direct requirement values selectable in this embodiment. In the chart of FIG. 11, an open circle indicates that the actuator direct requirement value is selected. In this embodiment, the actuator direct requirement value is of three types: the TA direct requirement value, the SA direct requirement value, and the A/F direct requirement value, so that there are eight possible combinations, C1 to C8, as shown in the chart for the combination of selection of these types of values.

The changeover commanding sub-unit 68 uses the engine information to determine the most advantageous selection pattern from among the eight selection patterns shown in the chart of FIG. 11 and commands each of the changeover sub-units 62, 64, and 66 to change the control individually based on the decision made. Each of the actuators 2, 4, and 6 can therefore be appropriately operated, which enhances accuracy of achieving various types of performance requirements generated by the performance requirement generating unit 10.

A procedure to individually change the control of each of the actuators 2, 4, and 6 will be described below. A case, in which the changeover condition for changing from the control according to the actuator direct requirement value to the control according to the torque achievement unit requirement value for all or some of the actuators 2, 4, and 6 is met, will be first described. The embodiment is not, however, concerned with specific details of the changeover condition. In this case, the changeover commanding sub-unit 68 commands the changeover sub-units 62, 64, and 66 to sequentially change the control according to a predetermined changeover sequence, instead of performing the changeovers all at once.

Referring to FIG. 12 as an example, the changeover procedure to change from the control according to the actuator direct requirement value to the control according to the torque achievement unit requirement value will herein be described. FIG. 12 shows a selection sequence from combination C1 to combination C8 shown in the chart of FIG. 11. In FIG. 12, an open circle indicates that the actuator direct requirement value is selected and a solid circle indicates that the torque achievement unit requirement value is selected.

In the example shown in FIG. 12, the control is changed to that according to the torque achievement unit requirement value in order of the ignition device 4 (CA), the fuel injection system 6 (A/F), and the throttle valve 2 (TA). At control changeover, the operation of each of the actuators 2, 4, and 6 may be discontinuous. If the control of each of the actuators 2, 4, and 6 is changed in sequence one at a time, however, there is no likelihood that discontinuity in the operation will be superimposed one on another among the actuators 2, 4, and 6. According to the example shown in FIG. 12, therefore, discontinuity in the operation of the internal combustion engine occurring at the changeover from the control according to the actuator direct requirement value to the control according to the torque achievement unit requirement value can be inhibited.

Additionally, in the example shown in FIG. 12, the actuator having a high torque response sensitivity to a change in the control amount is the first, for which the control is changed to that according to the torque achievement unit requirement value. Specifically, the torque response sensitivity determines the changeover priority, that is, the higher the sensitivity, the higher the priority. According to the function of the torque achievement unit 30, control amounts of actuators, for which the control is changed later, are reflected in the torque achievement unit requirement value of an actuator, for which the control is changed earlier. Consequently, changing the control for the actuator having high torque response sensitivity first allows the torque adjusting function of the torque achievement unit 30 to work effectively. Torque steps occurring as a result of the changeover of the other actuators thereafter can therefore be inhibited.

The standard changeover command by the changeover commanding sub-unit 68 is sequential changeover as described above. The changeover commanding sub-unit 68 may nonetheless command the changeover sub-units 62, 64, and 66 to change the control to that according to the torque achievement unit requirement value simultaneously for all actuators 2, 4, and 6. This is, however, limited only if a predetermined simultaneous changeover condition is met. By enabling selection of the sequential changeover or the simultaneous changeover as shown in the example of FIG. 12, the selection of the sequential changeover allows inhibition of discontinued operation of the internal combustion engine to be given priority in some situations. In other situations, the selection of the simultaneous changeover allows a prompt changeover to the control according to the torque achievement unit requirement value to be given priority.

Figure 13:
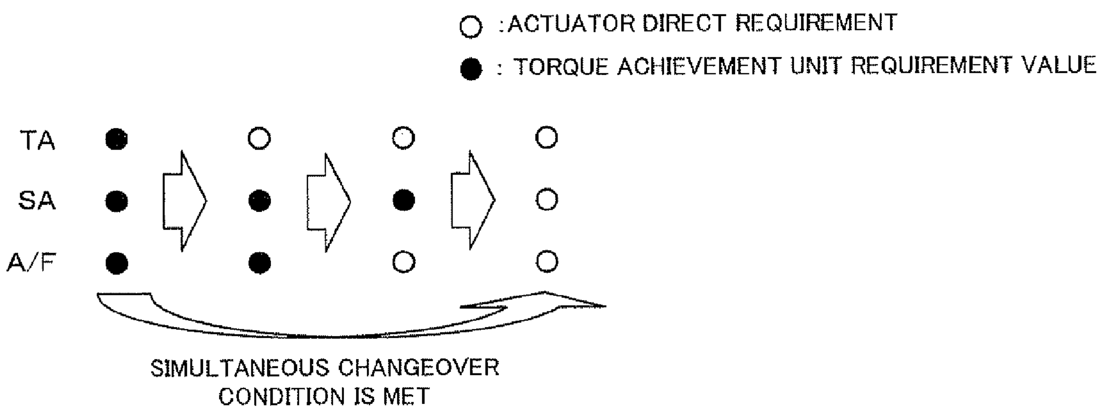
FIG. 13 is a diagram showing steps through which control is changed from that according to the torque achievement unit requirement values to that according to the actuator direct requirement values according to the fifth embodiment of the present invention.

In contrast to the case described above, a case, in which the changeover condition for changing from the control according to the torque achievement unit requirement value to the control according to the actuator direct requirement value for all or some of the actuators 2, 4, and 6 is met, will be next described. In this case, too, the changeover commanding sub-unit 68 commands the changeover sub-units 62, 64, and 66 to sequentially change the control according to a predetermined reverse changeover sequence, instead of performing the changeovers all at once. An example of the changeover procedure in this case is shown in FIG. 13. FIG. 13 shows a selection sequence from combination C8 to combination C1 shown in the chart of FIG. 11. In FIG. 13, an open circle indicates that the actuator direct requirement value is selected and a solid circle indicates that the torque achievement unit requirement value is selected.

In the example shown in FIG. 13, the control is changed to that according to the actuator direct requirement value in order of the throttle valve 2 (TA), the fuel injection system 6 (A/F), and the ignition device 4 (SA). By changing the control for each of the actuators 2, 4, and 6 sequentially one at a time as described above, discontinued operation of the internal combustion engine occurring at the changeover from the control according to the torque achievement unit requirement value to the control according to the actuator direct requirement value can be inhibited. As in the example described earlier, however, the control of all of the actuators 2, 4, and 6 is also adapted to be changed all at once to that according to the actuator direct requirement value only if a predetermined condition for the simultaneous changeover is met.

Additionally, in the example shown in FIG. 13, the actuator having high torque control ability is the first, for which the control is changed to that according to the actuator direct requirement value. Specifically, the torque control ability determines the changeover priority, that is, the higher the torque control ability, the higher the priority. By changing the control of the actuator having high torque control ability first, torque controllability at the changeover can be guaranteed, while torque steps occurring as a result of discontinuous operation of the internal combustion engine can be inhibited.

The fifth embodiment of the present invention has been described. The fifth embodiment embodies first, tenth, 11th, 12th, 13th, 14th, and 15th aspects of the present invention. More specifically, in the arrangement shown in FIG. 10, the engine requirement value generating unit 20 corresponds to “engine requirement value generating means” in the first aspect of the present invention. The information generating source 12 corresponds to “engine information acquiring means” in the first aspect of the present invention. The torque achievement unit 30 corresponds to “actuator requirement value calculating means” in the first aspect of the present invention. The actuator direct requirement value generating unit 40 corresponds to “actuator direct requirement value generating means” in the first aspect of the present invention. The changeover sub-units 62, 64, and 66 correspond to “changeover means” in the first and tenth aspects of the present invention. The changeover commanding sub-unit 68 corresponds to “changeover commanding means” in each of the tenth to 15th aspects of the present invention. FIG. 12, in particular, shows the operation of the changeover commanding sub-unit 68 as the “changeover commanding means” in each of the 11th, 12th, and 15th aspects of the present invention. FIG. 13 shows the operation of the changeover commanding sub-unit 68 as the “changeover commanding means” in each of the 13th, 14th, and 15th aspects of the present invention.

Sixth Embodiment

Figure 14:
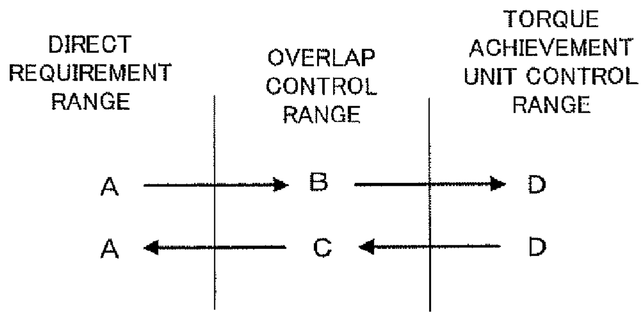
FIG. 14 is a diagram for illustrating a changeover control performed in a sixth embodiment of the present invention.

A sixth embodiment of the present invention will be described below with reference to FIGS. 10 and 14.

A general arrangement of a control apparatus according to this embodiment is the same as that of the fifth embodiment as shown in the block diagram of FIG. 10. The control apparatus according to this embodiment differs from the control apparatus of the fifth embodiment in the function of the selection changeover unit 60 that serves as one of elements constituting the control apparatus. The function of the selection changeover unit 60 according to this embodiment may be described with reference to FIG. 14. The function of the selection changeover unit 60 that characterizes this embodiment will be described below with reference to FIGS. 1 and 14.

The selection changeover unit 60 according to this embodiment is functionally characterized in that an overlap control is performed to smoothly link the control according to the actuator direct requirement value with the control according to the torque achievement unit requirement value. Referring to FIG. 14, the overlap control is performed at two different timings; specifically, an overlap control (B) is performed when the control is changed from that according to the actuator direct requirement value (A) to that according to the torque achievement unit requirement value (D) and an overlap control (C) is performed when the control is changed from that according to the torque achievement unit requirement value (D) to that according to the actuator direct requirement value (A). In the overlap control (B), the control amount to be supplied to the actuators 2, 4, and 6 is gradually changed from the actuator direct requirement value to the torque achievement unit requirement value. In the overlap control (C), the control amount to be supplied to the actuators 2, 4, and 6 is gradually changed from the torque achievement unit requirement value to the actuator direct requirement value.

The overlap control is performed for each of the changeover sub-units 62, 64, and 66 individually on receipt of a command from the changeover commanding sub-unit 68. The changeover commanding sub-unit 68 determines whether or not to perform the overlap control based on the engine information. The changeover commanding sub-unit 68 makes the decision for each of the actuators 2, 4, and 6, so that the overlap control may be performed only for the control of the throttle valve 2, and not for the control of the ignition device 8 or the fuel injection system 6.

The control is gradually changed between that according to the actuator requirement value and that according to the actuator direct requirement value through the overlap control. Consequently, should there be a difference between the torque achievement unit requirement value and the actuator direct requirement value, discontinuity of operation of the internal combustion engine occurring due to the difference can be inhibited. Note that the overlap control may be combined with the sequential changeover control described with reference to the fifth embodiment. The combination of the overlap control and the sequential changeover control allows discontinuity in the operation of the internal combustion engine occurring at the changeover to be even more reliably inhibited.

The sixth embodiment of the present invention has been described. The sixth embodiment embodies first, tenth, and 16th aspects of the present invention. More specifically, the changeover operation shown in FIG. 14 represents the operation of the changeover sub-units 62, 64, and 66 as “changeover means” of the 16th aspect of the present invention. Correspondence of the sixth embodiment to the first and tenth aspects of the present invention is the same as that of the fifth embodiment.

Seventh Embodiment

A seventh embodiment of the present invention will be described below with reference to FIGS. 10, 4, 15, and 16(*a*) and 16(*b*).

A general arrangement of a control apparatus according to this embodiment is the same as that of the fifth embodiment as shown in the block diagram of FIG. 10. The control apparatus according to this embodiment is characterized in the changeover control that changes control of each of the throttle valve 2 and the ignition device 4 from that according to the actuator direct requirement value to that according to the torque achievement unit requirement value. The embodiment is not concerned with the control of the fuel injection system 6. Details of the changeover control according to this embodiment may be described with reference to FIGS. 15 and 16(*a*) and 16(*b*). Arrangements of the torque achievement unit 30 are important in this embodiment and are based on the arrangement of the torque achievement unit 30 shown in FIG. 4. The function of the selection changeover unit 60 that characterizes this embodiment will be described below with reference to FIGS. 15 and 16(*a*) and 16(*b*), together with FIGS. 10 and 4.

Figure 15:
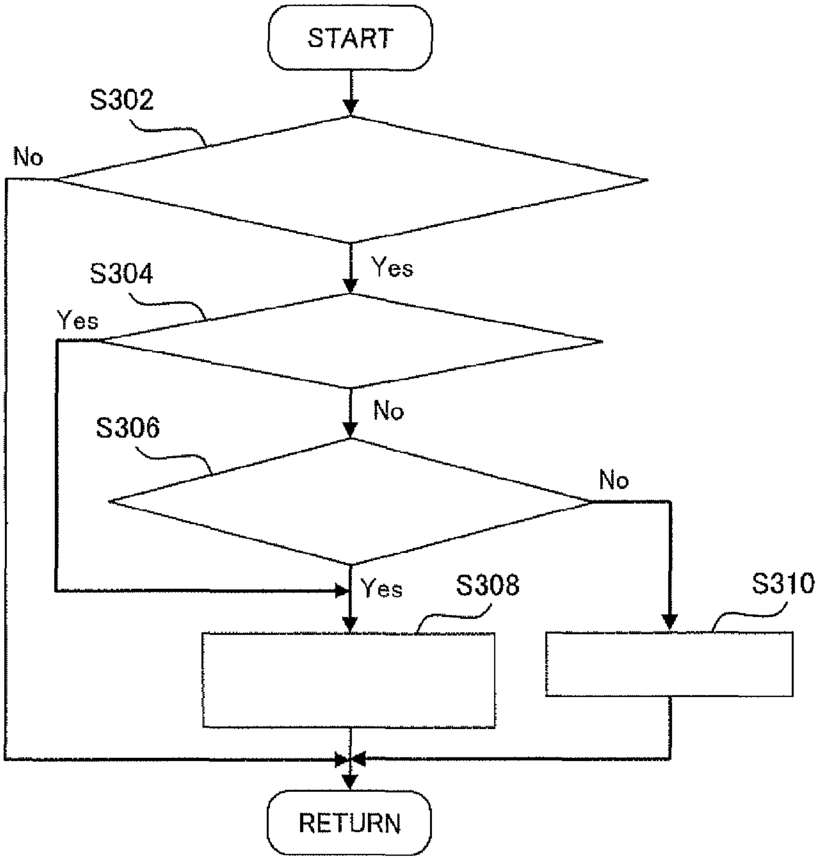
FIG. 15 is a flowchart showing a changeover control routine through which control is changed from that according to a TA direct requirement value and an SA direct requirement value to that according to a torque achievement unit TA requirement value and a torque achievement unit SA requirement value, which is performed in a seventh embodiment of the present invention.

FIG. 15 is a flowchart showing a changeover control routine through which control is changed from that according to the TA direct requirement value and the SA direct requirement value to that according to the torque achievement unit TA requirement value and the torque achievement unit SA requirement value, which is performed by the changeover commanding sub-unit 68 of the selection changeover unit 60 in this embodiment. In step S302, the first step of this routine, it is determined, based on the engine information supplied from the information generating source 12, whether or not there is a requirement for change from a control range according to the actuator direct requirement value to a control range according to the torque achievement unit requirement value (torque achievement unit control range). If there is no change requirement, this routine is immediately terminated to thereby let the control according to the TA direct requirement value and the SA direct requirement value continue.

If it is determined that there is a requirement for change to the torque achievement unit control range, it is then determined in subsequent step S304 whether or not there is a requirement for early change. This embodiment assumes the determination of the early change requirement to be the simultaneous changeover condition. If there is an early change requirement, specifically, if the simultaneous changeover condition is met, operation proceeds to step S308 and the change to the torque achievement unit control range is swiftly made. Hereafter, the throttle valve 2 is controlled by the torque achievement unit TA requirement value and the ignition device 4 is controlled by the torque achievement unit SA requirement value.

Figure 16A:
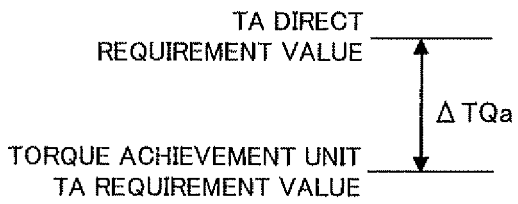
FIGS. 16(*a*) and 16(*b*) are diagrams for illustrating torque deviation ΔTQ that is produced by a difference between the TA direct requirement value and a torque achievement unit TA requirement value when control according to the actuator direct requirement value is changed to control according to the torque achievement unit requirement value.
Figure 16B:
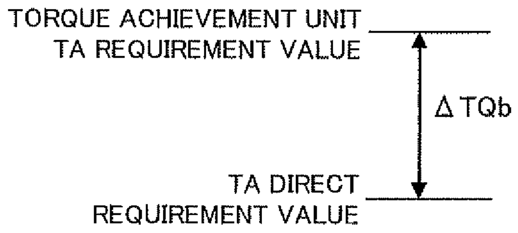

If there is no early change requirement, a decision is made in step S306. In step S306, from a difference between the current TA direct requirement value and the current torque achievement unit TA requirement value, a torque deviation ΔTQ produced from the difference is calculated. The torque deviation ΔTQ may be a torque deviation ΔTQa produced when the TA direct requirement value is greater than the torque achievement unit TA requirement value as shown in FIG. 16(*a*) or a torque deviation ΔTQb produced when the torque achievement unit TA requirement value is greater than the TA direct requirement value as shown in FIG. 16(*b*). In step S306, it is determined whether or not the ignition timing control can compensate for the torque deviation ΔTQ.

As a condition for the decision of step S306, control of at least the ignition device 4 is swiftly changed to that according to the torque achievement unit SA requirement value. According to the arrangement of the torque achievement unit 30 shown in FIG. 4, the estimated air amount calculating section 308 calculates the estimated air amount to be achieved by the throttle valve 2 being controlled according to the TA direct requirement value. The estimated torque calculating section 310 then calculates the estimated torque that corresponds to the estimated air amount. In addition, the torque achievement unit TA requirement value is calculated based on the torque requirement value supplied from the torque mediatory sub-unit 22 and the abovementioned torque deviation ΔTQ represents the difference between the torque requirement value and the estimated torque. According to the torque achievement unit 30 as arranged as shown in FIG. 4, the torque achievement unit SA requirement value is calculated so as to compensate for the torque deviation ΔTQ, based on torque efficiency that is a ratio between the torque requirement value and the estimated torque.

The adjustment of ignition timing by the ignition device 4 has higher torque response sensitivity than the adjustment of the intake air amount by the throttle valve 2. Even if the changeover from the TA direct requirement value to the torque achievement unit TA requirement value produces the torque deviation ΔTQ, the automatic adjusting function of the ignition timing which the torque achievement unit 30 has compensates for the torque deviation ΔTQ.

There is, however, a limit to the torque that can be adjusted by the ignition timing. Excessively retarded ignition timing leads to misfire and advancing the ignition timing to exceed optimum ignition timing is meaningless. An effective range of ignition timing is specified by the upper and lower limit guard values of the torque efficiency guard sub-section 324. If the torque efficiency is limited by the torque efficiency guard sub-section 324, even the adjustment of the ignition timing is unable to compensate for the torque deviation ΔTQ. The decision-making step of S306 represents this very point. Operation proceeds to step S308 only if the torque deviation ΔTQ can be compensated for by the ignition timing control, so that the control is swiftly changed to the torque achievement unit control range. Specifically, changeover to the torque achievement unit TA requirement value is performed at the same time with the changeover to the torque achievement unit SA requirement value.

If it is determined, on the other hand, that the torque deviation ΔTQ cannot be practically compensated for by the ignition timing control, operation proceeds to step S310. In step S310, gradual change control is performed for the throttle valve 2. The control for the ignition device 4 is swiftly changed from that according to the SA direct requirement value to that according to the torque achievement unit SA requirement value. In the gradual change control, the TA direct requirement value is gradually changed toward the torque achievement unit TA requirement value. This gradually decreases the difference between the TA direct requirement value and the torque achievement unit TA requirement value, so that the torque deviation ΔTQ produced by the difference also decreases. When the torque deviation ΔTQ is eventually decreased to such a value that permits compensation by the ignition timing control, the control of the throttle valve 2 is swiftly changed from that according to the TA direct requirement value to that according to the torque achievement unit TA requirement value.

The performance of the changeover control routine by the changeover commanding sub-unit 68 as described above helps prevent the torque step involved in the changeover from occurring even with a large difference between the TA direct requirement value and the torque achievement unit TA requirement value. Additionally, when it becomes practicable to compensate for the torque deviation with the adjustment of the ignition timing, the control of the throttle valve 2 is swiftly changed to that according to the torque achievement unit TA requirement value. The control according to the actuator direct requirement value can therefore be swiftly changed to that according to the torque achievement unit requirement value, while the torque step can be prevented from occurring.

The seventh embodiment of the present invention has been described. The seventh embodiment embodies first, tenth, 19th, 20th, and 21st aspects of the present invention. More specifically, the arrangement of the torque achievement unit 30 shown in FIG. 4 corresponds to an “engine inverse model” of the 19th aspect of the present invention. The changeover control routine shown in FIG. 15 represents the operation of the changeover commanding sub-unit 68 as “changeover commanding means” of the 19th, 20th, and 21st aspects of the present invention. Correspondence of the seventh embodiment to the first and tenth aspects of the present invention is the same as that of the fifth embodiment.

Additionally, the seventh embodiment includes an aspect that differs from any of the first through 24th aspects of the present invention.

The aspect is: “a control apparatus for an internal combustion engine whose operation is controlled by multiple actuators including an intake actuator for adjusting an intake air amount and an ignition actuator for adjusting ignition timing, the control apparatus comprising: engine requirement value acquiring means for acquiring a single or multiple requirement values representing a single or multiple predetermined physical quantities including at least torque (hereinafter referred to as an “engine requirement value”) that determine an operation of the internal combustion engine; engine information acquiring means for acquiring information on a current operating state or operating condition of the internal combustion engine (hereinafter referred to as “engine information”); intake actuator requirement value calculating means for calculating, from each value representing a corresponding one of the single or multiple predetermined physical quantities and the engine information, a control amount of the intake actuator for achieving the values in the internal combustion engine; torque estimating means for estimating a torque value to be achieved by an operation of the intake actuator based on the engine information; ignition actuator requirement value calculating means for calculating, as an ignition actuator requirement value, control amount of the ignition actuator for compensating for a difference between a torque requirement value and the estimated torque value; intake actuator direct requirement value acquiring means for acquiring a control amount to be directly required of the intake actuator as an intake actuator direct requirement value; ignition actuator direct requirement value generating means for acquiring a control amount to be directly required of the ignition actuator as an ignition actuator direct requirement value; changeover means for changing control of the intake actuator and the ignition actuator individually between that according to the actuator requirement value and that according to the actuator direct requirement value; and changeover commanding means for commanding, when a changeover condition for changing from the control according to the actuator direct requirement value to the control according to the actuator requirement value is met for the intake actuator and the ignition actuator, the changeover means to change the control of the ignition actuator from that according to the ignition actuator direct requirement value to that according to the ignition actuator requirement value; determining, based on a relationship between the ignition actuator requirement value and an adjustable range of the ignition timing, whether or not compensation is feasible for torque deviation as calculated from a current difference between the intake actuator direct requirement value and the intake actuator requirement value through the adjustment of the ignition timing; and commanding, if determined that the compensation is not feasible, the changeover means to gradually change the control of the intake actuator from that according to the intake actuator direct requirement value to that according to the intake actuator requirement value”.

Eighth Embodiment

An eighth embodiment of the present invention will be described below with reference to FIGS. 10, 4, and 17.

A general arrangement of a control apparatus according to this embodiment is the same as that of the fifth embodiment as shown in the block diagram of FIG. 10. The control apparatus according to this embodiment is characterized in the changeover control that changes control of each of the throttle valve 2 and the ignition device 4 from that according to the torque achievement unit requirement value to that according to the actuator direct requirement value. The embodiment is not concerned with the control of the fuel injection system 6. Details of the changeover control according to this embodiment may be described with reference to FIG. 17. Arrangements of the torque achievement unit 30 are important in this embodiment and are based on the arrangement of the torque achievement unit 30 shown in FIG. 4. The function of the selection changeover unit 60 that characterizes this embodiment will be described below with reference to FIG. 17, together with FIGS. 10 and 4.

Figure 17:
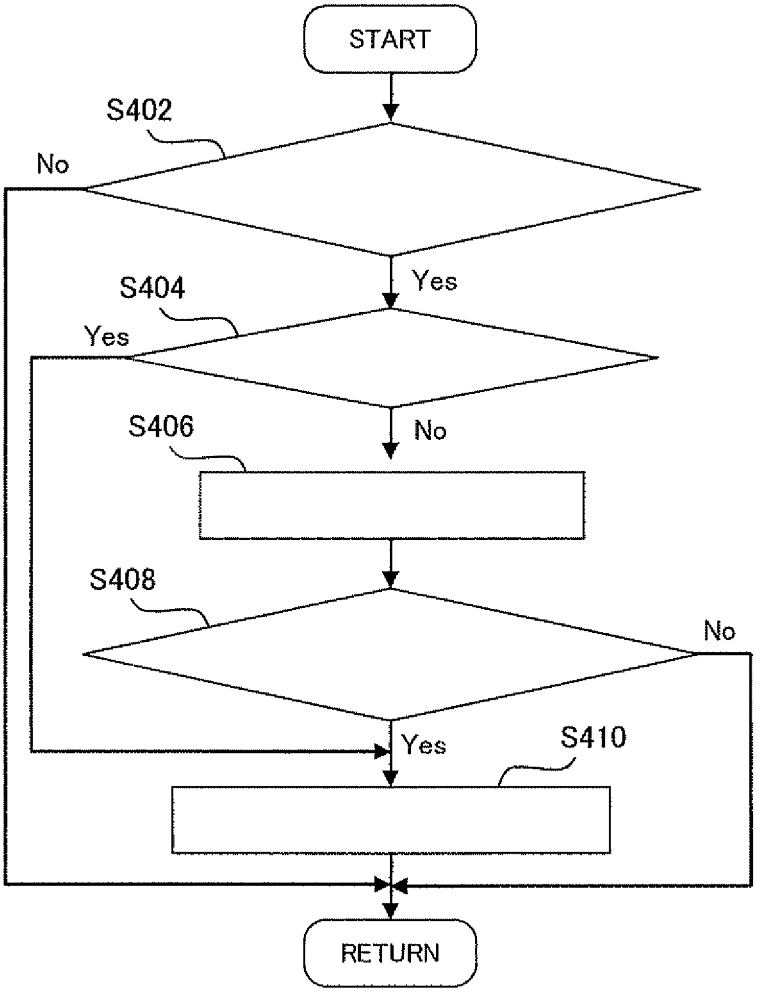
FIG. 17 is a flowchart showing a changeover control routine through which control is changed from that according to the torque achievement unit TA requirement value and the torque achievement unit SA requirement value to that according to the TA direct requirement value and the SA direct requirement value, which is performed in an eighth embodiment of the present invention.

FIG. 17 is a flowchart showing a changeover control routine through which control is changed from that according to the torque achievement unit TA requirement value and the torque achievement unit SA requirement value to that according to the TA direct requirement value and the SA direct requirement value, which is performed by the changeover commanding sub-unit 68 of the selection changeover unit 60 in this embodiment. In step S402, the first step of this routine, it is determined, based on the engine information supplied from the information generating source 12, whether or not there is a requirement for change from a control range according to the torque achievement unit requirement value to a control range according to the actuator direct requirement value. If there is no change requirement, this routine is immediately terminated to thereby let the control according to the torque achievement unit TA requirement value and the torque achievement unit SA requirement value continue.

If it is determined that there is a requirement for change to the actuator direct requirement range, it is then determined in subsequent step S404 whether or not there is a requirement for early change. This embodiment assumes the determination of the early change requirement to be the simultaneous changeover condition. If there is an early change requirement, specifically, if the simultaneous changeover condition is met, operation proceeds to step S410 and the change to the actuator direct requirement range is swiftly made. Hereafter, the throttle valve 2 is controlled according to the TA direct requirement value and the ignition device 4 is controlled according to the SA direct requirement value.

If there is no early change requirement, operation proceeds to step S406. In step S406, a change is first made to the actuator direct requirement range only for the throttle valve 2 and the throttle valve 2 is controlled according to the TA direct requirement value. According to the arrangement of the torque achievement unit 30 shown in FIG. 4, the estimated air amount calculating section 308 calculates the estimated air amount to be achieved by the throttle valve 2 being controlled according to the TA direct requirement value. The estimated torque calculating section 310 then calculates the estimated torque that corresponds to the estimated air amount. Because the control according to the torque achievement unit SA requirement value continues for the ignition device 4 at this time, the ignition timing is automatically adjusted so as to compensate for the torque deviation between the torque requirement value and the estimated torque. Even if there is a difference between the torque achievement unit TA requirement value and the TA direct requirement value at the changeover, the torque deviation produced from the difference is compensated for by the ignition timing automatic adjusting function, so that the operation of step S406 inhibits the torque step from being produced.

A decision is made next in step S408. In step S408, it is determined whether or not the difference between the TA direct requirement value and the actually achieved throttle valve opening falls within a predetermined acceptable range. If the difference does not fall within the acceptable range, this routine is immediately terminated to thereby let the control according to the TA direct requirement value and the torque achievement unit SA requirement value continue. Note that, if the basis for calculating the TA direct requirement value is the intake air amount requirement value, it may be determined if the difference between the air amount requirement value and the actual intake air amount falls within an acceptable range.

When the difference between the TA direct requirement value and the actual throttle valve opening falls within the acceptable range, specifically, when it is determined that the control of the throttle valve 2 is completely changed to the control according to the TA direct requirement value, operation proceeds to step S410. In step S410, the control of the ignition device 4 is also changed to the actuator direct requirement range and the control of the ignition device 4 according to the SA direct requirement value is started. This completes the change to the control according to the TA direct requirement value and the SA direct requirement value.

The performance of the changeover control routine by the changeover commanding sub-unit 68 as described above helps prevent the torque step involved in the changeover from occurring even with a large difference between the torque achievement unit TA requirement value and the TA direct requirement value. Additionally, the throttle valve 2 having high torque control ability is the first one, for which control is changed to that according to the TA direct requirement value, which guarantees torque controllability until the changeover for all is completed.

The eighth embodiment of the present invention has been described. The eighth embodiment embodies first, tenth, 22nd, 23rd, and 24th aspects of the present invention. More specifically, the arrangement of the torque achievement unit 30 shown in FIG. 4 corresponds to an "engine inverse model" of the 22nd aspect of the present invention. The changeover control routine shown in FIG. 17 represents the operation of the changeover commanding sub-unit 68 as "changeover commanding means" of the 22nd, 23rd, and 24th aspects of the present invention. Correspondence of the eighth embodiment to the first and tenth aspects of the present invention is the same as that of the fifth embodiment.

Additionally, the eighth embodiment includes an aspect that differs from any of the first through 24th aspects of the present invention.

The aspect is: "a control apparatus for an internal combustion engine whose operation is controlled by multiple actuators including an intake actuator for adjusting an intake air amount and an ignition actuator for adjusting ignition timing, the control apparatus comprising: engine requirement value acquiring means for acquiring a single or multiple requirement values representing a single or multiple predetermined physical quantities including at least torque (hereinafter referred to as an "engine requirement value") that determine an operation of the internal combustion engine; engine information acquiring means for acquiring information on a current operating state or operating condition of the internal combustion engine (hereinafter referred to as "engine information"); intake actuator requirement value calculating means for calculating, from each value representing a corresponding one of the single or multiple predetermined physical quantities and the engine information, a control amount of the intake actuator for achieving the values in the internal combustion engine; torque estimating means for estimating a torque value to be achieved by an operation of the intake actuator based on the engine information; ignition actuator requirement value calculating means for calculating, as an ignition actuator requirement value, a control amount of the ignition actuator for compensating for a difference between a torque requirement value and the estimated torque value; intake actuator direct requirement value acquiring means for acquiring a control amount to be directly required of the intake actuator as an intake actuator direct requirement value; ignition actuator direct requirement value acquiring means for acquiring a control amount to be directly required of the ignition actuator as an ignition actuator direct requirement value; changeover means for changing control of the intake actuator and the ignition actuator individually between that according to the actuator requirement value and that according to the actuator direct requirement value; and changeover commanding means for commanding, when a changeover condition for changing from the control according to the actuator requirement value to the control according to the actuator direct requirement value is met for the intake actuator and the ignition actuator, the changeover means to change the control of the intake actuator from that according to the intake actuator requirement value to that according to the intake actuator direct requirement value; and thereafter commanding the changeover means to change the control of the ignition actuator from that according to the ignition actuator requirement value to that according to the ignition actuator direct requirement value".

Ninth Embodiment

Finally, a ninth embodiment of the present invention will be described below with reference to FIGS. 10, 18, 19, and 20.

Figure 18:
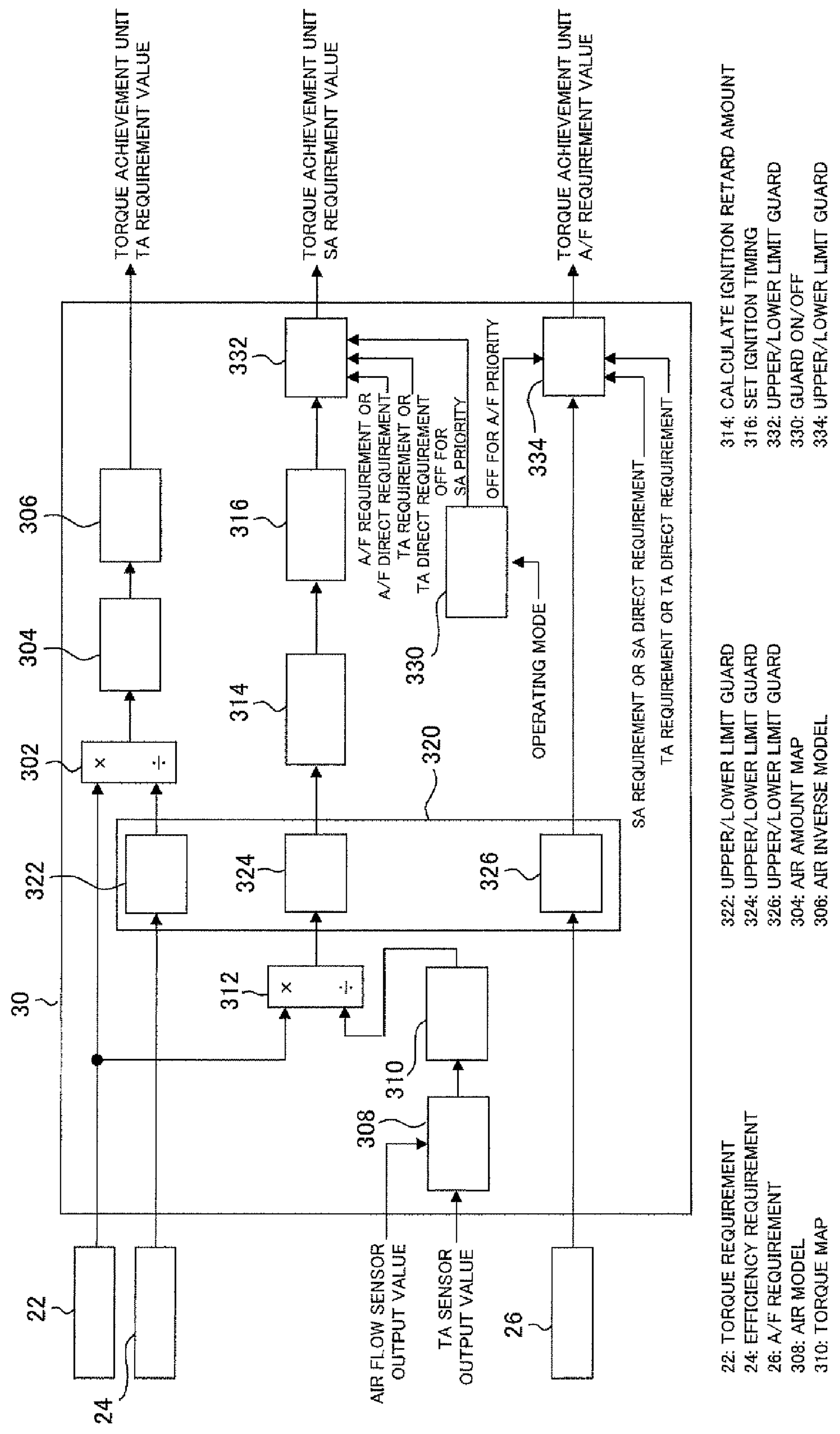
FIG. 18 is a block diagram showing an arrangement of a torque achievement unit according to a ninth embodiment of the present invention.

A general arrangement of a control apparatus according to this embodiment is the same as that of the fifth embodiment as shown in the block diagram of FIG. 10. The control apparatus according to this embodiment differs from the control apparatus according to the fifth embodiment in a new element added to the torque achievement unit 30. A block diagram of FIG. 18 shows an arrangement of the torque achievement unit 30 according to this embodiment. In the arrangement shown in FIG. 18, like reference numerals are used to identify like elements as those of the arrangement shown in FIG. 4. The function of the new element added to the torque achievement unit 30 in this embodiment may be described with reference to FIGS. 19 and 20. The function of the torque achievement unit 30 that characterizes this embodiment will be described below with reference to FIGS. 18, 19, and 20, together with FIG. 10.

The torque achievement unit 30 according to this embodiment is functionally characterized in that aggravation of combustion that can occur when some of the actuators 2, 4, and 6 is controlled according to the actuator direct requirement value can be prevented. When all of the actuators 2, 4, and 6 are controlled according to the torque achievement unit requirement value, the control amount of each of the actuators 2, 4, and 6 is adjusted relative to each other so as to keep within the combustion limit through the adjusting function the adjusting section 320 of the torque achievement unit 30 has. If some of the actuators 2, 4, and 6 is controlled according to the actuator direct requirement value, the control amount of the actuator in question is set regardless of control amounts of other actuators, so that the control amount of one actuator relative to others may result in the combustion limit being exceeded. Such a problem can be prevented by the arrangement of the torque achievement unit 30 as described below.

Referring to FIG. 18, the torque achievement unit 30 according to this embodiment includes, as new elements, an SA requirement value correcting section 332, an A/F requirement value correcting section 334, and a priority requirement changeover section 330, all added to the arrangement of the torque achievement unit 30 shown in FIG. 4. The SA requirement value correcting section 332 limits upper and lower limits of the torque achievement unit SA requirement value outputted from the torque achievement unit 30, so that the torque achievement unit SA requirement value can be corrected so as to fall within a range in which the proper operation of the internal combustion engine is enabled. The A/F requirement value correcting section 334 limits upper and lower limits of the torque achievement unit A/F requirement value outputted from the torque achievement unit 30, so that the torque achievement unit A/F requirement value can be corrected so as to fall within a range in which the proper operation of the internal combustion engine is enabled. Note that the torque achievement unit SA requirement value or the torque achievement unit A/F requirement value is subject to the correction, and not the torque achievement unit TA requirement value. This is because the torque achievement unit TA requirement value affects torque the most and is set to the highest priority for achievement.

Guard by the SA requirement value correcting section 332 and that by the A/F requirement value correcting section 334 are mutually exclusive and the priority requirement changeover section 330 selects the correcting section 332 or 334 for which the guard is canceled. The priority requirement changeover section 330 determines the guard to be canceled according to the operating mode of the internal combustion engine. When the operating mode of the internal combustion engine is the efficiency preferential mode, priority is given to achievement of the SA requirement, so that a guard OFF signal is supplied to the SA requirement value correcting section 332. Conversely, when the operating mode of the internal combustion engine is the A/F preferential mode, priority is given to achievement of the A/F requirement, so that a guard OFF signal is supplied to the A/F requirement value correcting section 334.

The upper and lower limit guard values of the SA requirement value correcting section 332 are set based on the control amount currently supplied to the throttle valve 2 (the TA direct requirement value or the torque achievement unit TA requirement value) and the control amount currently supplied to the fuel injection system 6 (the A/F direct requirement value or the torque achievement unit A/F requirement value). When the priority requirement changeover section 330 supplies the SA requirement value correcting section 332 with the guard OFF signal, the upper and lower limit guard values are set to invalid values, so that the guard for the torque achievement unit SA requirement value by the SA requirement value correcting section 332 is canceled.

The upper and lower limit guard values of the A/F requirement value correcting section 334 are set based on the control amount currently supplied to the throttle valve 2 (the TA direct requirement value or the torque achievement unit TA requirement value) and the control amount currently supplied to the ignition device 4 (the SA direct requirement value or the torque achievement unit SA requirement value). When the priority requirement changeover section 330 supplies the A/F requirement value correcting section 334 with the guard OFF signal, the upper and lower limit guard values are set to invalid values, so that the guard for the torque achievement unit A/F requirement value by the A/F requirement value correcting section 334 is canceled.

Figure 19:
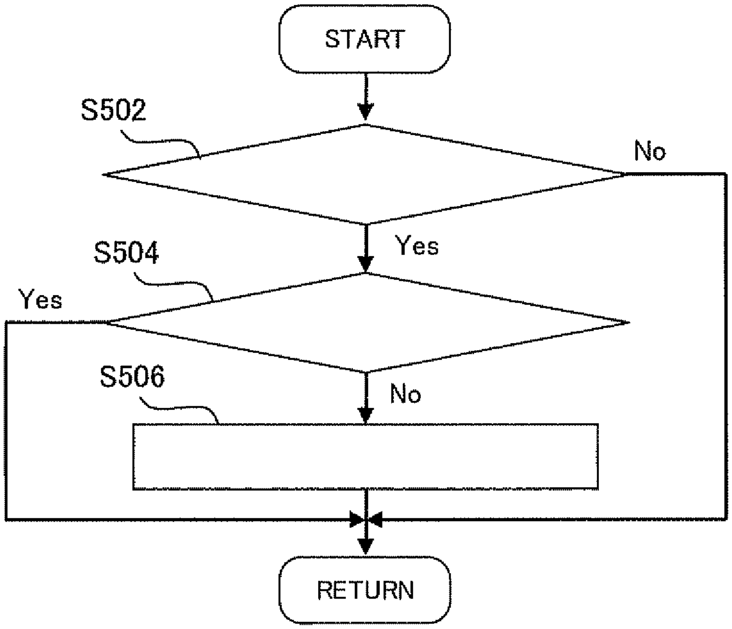
FIG. 19 is a flowchart showing a control routine for correcting a torque achievement unit A/F requirement value for combustion improvement, which is performed in the ninth embodiment of the present invention.
Figure 20:
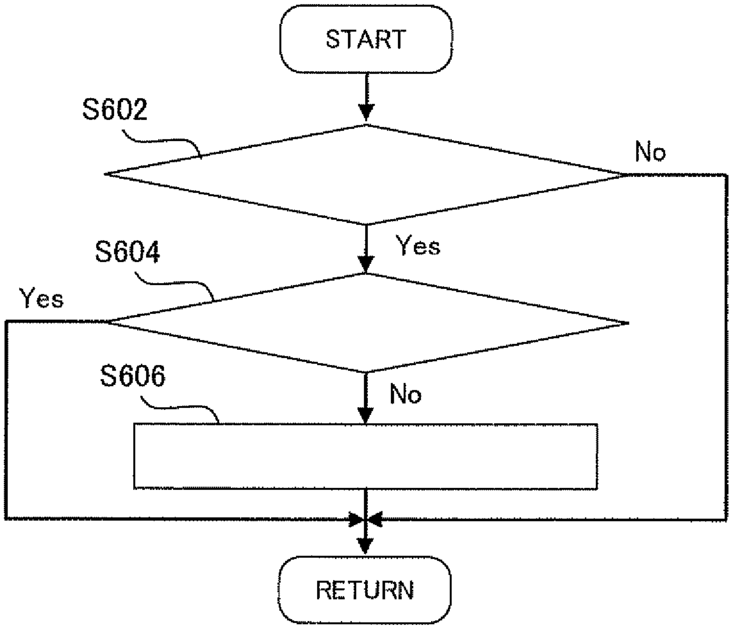
FIG. 20 is a flowchart showing a control routine for correcting the torque achievement unit SA requirement value for combustion improvement, which is performed in the ninth embodiment of the present invention.

FIGS. 19 and 20 are flowcharts showing operations of the torque achievement unit 30 achieved by the arrangement as described above. FIG. 19 is a flowchart showing a control routine for correcting the torque achievement unit A/F requirement value for combustion improvement. FIG. 20 is a flowchart showing a control routine for correcting the torque achievement unit SA requirement value for combustion improvement. These routines are performed by the torque achievement unit 30 in parallel with each other.

In step S502, the first step of the routine shown in FIG. 19, it is determined whether or not the relationship in the control amounts among the actuators 2, 4, and 6 exceed the combustion limit. If the relationship does not exceed the combustion limit, this routine is immediately terminated.

If the relationship exceeds the combustion limit, operation proceeds to step S504, in which it is determined whether priority is given to achievement of the A/F requirement over that of the SA requirement. If the priority is given to the achievement of the A/F requirement, this routine is immediately terminated.

If the priority is given to the achievement of the SA requirement over that of the A/F requirement, operation proceeds to step S506. In step S506, combustion improvement control by A/F is performed. Specifically, the guard for the torque achievement unit SA requirement value by the SA requirement value correcting section 332 is canceled and the torque achievement unit A/F requirement value is corrected by the upper and lower limit guard values of the A/F requirement value correcting section 334.

In step S602, the first step of the routine shown in FIG. 20, it is determined whether or not the relationship in the control amounts among the actuators 2, 4, and 6 exceed the combustion limit. If the relationship does not exceed the combustion limit, this routine is immediately terminated.

If the relationship exceeds the combustion limit, operation proceeds to step S604, in which it is determined whether priority is given to achievement of the SA requirement over that of the A/F requirement. If the priority is given to the achievement of the SA requirement, this routine is immediately terminated.

If the priority is given to the achievement of the A/F requirement over that of the SA requirement, operation proceeds to step S606. In step S606, combustion improvement control by ignition timing is performed. Specifically, the guard for the torque achievement unit A/F requirement value by the A/F requirement value correcting section 334 is canceled and the torque achievement unit SA requirement value is corrected by the upper and lower limit guard values of the SA requirement value correcting section 332.

Even when the performance of each of the routines shown in FIGS. 19 and 20 in the torque achievement unit 30 results in the control according to the actuator direct requirement value being performed for some of the actuators, the control amount of each of the actuators 2, 4, and 6 relative to each other can be kept to fall within the combustion limit, as when all of the actuators 2, 4, and 6 are controlled according to the torque achievement unit requirement value. In addition, because what is corrected is the torque achievement unit requirement value with low achievement priority, the torque achievement unit requirement value with high achievement priority can be directly achieved. Additionally, the torque achievement unit requirement value and the actuator direct requirement value with high achievement priority are reflected in the correction. The torque achievement unit requirement value to be corrected can therefore be appropriately corrected so that the relationship in the control amounts among the actuators 2, 4, and 6 falls within the combustion limit.

The ninth embodiment of the present invention has been described. The ninth embodiment embodies tenth, 17th, and 18th aspects of the present invention. More specifically, in the arrangement shown in FIG. 18, the SA requirement value correcting section 332, the A/F requirement value correcting section 334, and the priority requirement changeover section 330 constitute "correcting means" in the 17th and 18th aspects of the present invention. Correspondence of the ninth embodiment to the tenth aspect of the present invention is the same as that of the fifth embodiment.

Miscellaneous

The actuators subject to the control in the present invention are not limited only to the throttle, the ignition device, and the fuel injection system. For example, a variable lift amount mechanism, a variable valve timing mechanism (VVT), and an external EGR system may be actuators to be controlled. In an engine having a cylinder stop mechanism or a variable compression ratio mechanism, these mechanisms may be actuators to be controlled. In an engine having a motor-assisted turbocharger (MAT), the MAT may be used as an actuator to be controlled. Additionally, because auxiliaries driven by the engine, such as an alternator, can indirectly control the output of the engine, these auxiliaries may be used as the actuators.

The present invention is not limited to the above-described embodiments and various changes in form and detail may be made therein without departing from the spirit and scope of the invention. For example, the overlap control described with reference to the sixth embodiment may also be incorporated in the control apparatuses according to the first through fourth embodiments. This achieves "changeover means" according to the ninth aspect of the present invention.

DESCRIPTION OF THE REFERENCE NUMERALS

2: Throttle
4: Ignition device
6: Fuel injection system
10: Performance requirement generating unit
12: Information generating source
20: Engine requirement value generating unit
22: Torque mediatory sub-unit
24: Efficiency mediatory sub-unit
26: Air-fuel ratio mediatory sub-unit
30: Torque achievement unit (engine inverse model)
40: Actuator direct requirement value generating unit
42: TA direct requirement value calculating sub-unit
44: SA direct requirement value calculating sub-unit
46: A/F direct requirement value calculating sub-unit
50, 60: Selection changeover unit
52, 62: Changeover sub-unit (TA)
54, 64: Changeover sub-unit (SA)
56, 66: Changeover sub-unit (A/F)
58, 68: Changeover commanding sub-unit
302: Torque requirement value correcting section
304: Air amount requirement value calculating section
306: TA requirement value calculating section
308: Estimated air amount calculating section
310: Estimated torque calculating section
312: Torque efficiency calculating section
314: Ignition retard amount calculating section
316: SA requirement value calculating section
320: Adjusting section
322: Efficiency guard sub-section
324: Torque efficiency guard sub-section
326: A/F guard sub-section
330: Priority requirement changeover section
332: SA requirement value correcting section
334: A/F requirement value correcting section
502: Torque achievement value calculating section
504: Efficiency achievement value calculating section
506: A/F achievement value calculating section
508: Torque difference determining section
510: Efficiency difference determining section
512: A/F difference determining section
514: Engine model
520: Control method selecting section
530: TA difference determining section
532: SA difference determining section
534: A/F difference determining section

The invention claimed is:

1. A control apparatus for an internal combustion engine whose operation is controlled by multiple actuators, the control apparatus comprising:

engine requirement value acquiring means for acquiring a single or multiple requirement values representing a single or multiple predetermined physical quantities (hereinafter referred to as an "engine requirement value") that determine an operation of the internal combustion engine;

engine information acquiring means for acquiring information on a current operating state or operating condition of the internal combustion engine (hereinafter referred to as "engine information");

actuator requirement value calculating means having an engine inverse model that models, with physical models or statistical models using the engine information as a parameter, the relation between a control amount of each of the multiple actuators and each value representing a corresponding one of the single or multiple predetermined physical quantities achieved in the internal combustion engine, the actuator requirement value calculating means calculating comprehensively a control amount to be required of each of the multiple actuators (hereinafter referred to as an "actuator requirement value") by inputting each engine requirement value and the engine information to the engine inverse model;

actuator requirement value generating means which is prepared individually for each of the multiple actuators and generates, based on an engine requirement value associated with a control amount of an assigned actuator, a control amount to be required of the assigned actuator (hereinafter referred to as an "actuator direct requirement value") independently of each other; and changeover means for changing control of the multiple actuators between that according to the actuator requirement value and that according to the actuator direct requirement value.

2. The control apparatus for the internal combustion engine according to claim 1, further comprising:

changeover commanding means for selecting collectively for all of the multiple actuators, based on the engine information, either the control according to the actuator requirement value or the control according to the actuator direct requirement value and commanding the changeover means to change the control to that selected.

3. The control apparatus for the internal combustion engine according to claim 2, wherein: the changeover commanding means selects the control according to the actuator direct requirement value when the engine information acquired is low in reliability.

4. The control apparatus for the internal combustion engine according to claim 2, wherein: the changeover commanding means selects the control according to the actuator direct requirement value when the current operating state or operating condition of the internal combustion engine is not included in a condition of making the engine inverse model hold true.

5. The control apparatus for the internal combustion engine according to claim 2, further comprising:

engine achievement value acquiring means for acquiring a value of the single or multiple predetermined physical quantities achieved by the internal combustion engine (hereinafter referred to as an "engine achievement value");

wherein: the changeover commanding means commands the changeover means to change the control from that according to the actuator direct requirement value to that according to the actuator requirement value when, while the multiple actuators are being controlled according to the actuator direct requirement value, a difference of the engine achievement value from the engine requirement value for each of the single or multiple predetermined physical quantities falls within an acceptable range.

6. The control apparatus for the internal combustion engine according to claim 5, wherein: the engine achievement value acquiring means calculates the engine achievement value from the engine information acquired by the engine information acquiring means.

7. The control apparatus for the internal combustion engine according to claim 5, wherein: the engine achievement value acquiring means includes an engine model that derives, from each control amount of the multiple actuators, a value of the single or multiple predetermined physical quantities achieved by the control amount in the internal combustion engine, the engine achievement value acquiring means calculating the engine achievement value by inputting each actuator direct requirement value in the engine model.

8. The control apparatus for the internal combustion engine according to claim 2, wherein: the changeover commanding means commands the changeover means to change the control from that according to the actuator direct requirement value to that according to the actuator requirement value when, while the multiple actuators are being controlled according to the actuator direct requirement value, a difference of the actuator requirement value from the actuator direct requirement value for each of the multiple actuators falls within an acceptable range.

9. The control apparatus for the internal combustion engine according to claim 2, wherein: the changeover means gradually changes, when changing control between that according to the actuator requirement value and that according to the actuator direct requirement value, the value of the control amount to be required of each actuator from the actuator requirement value to the actuator direct requirement value, or from the actuator direct requirement value to the actuator requirement value.

10. The control apparatus for the internal combustion engine according to claim 1, wherein: the changeover means changes the control of each of the multiple actuators individually between that according to the actuator requirement value and that according to the actuator direct requirement value; and the control apparatus further includes changeover commanding means for selecting, based on the engine information, either the control according to the actuator requirement value or the control according to the actuator direct requirement value individually for each of the multiple actuators and commanding the changeover means to change the control to that selected.

11. The control apparatus for the internal combustion engine according to claim 10, wherein: the changeover commanding means commands, when a changeover condition for changing from the control according to the actuator direct requirement value to the control according to the actuator requirement value for all or some plural of the multiple actuators is met, the changeover means to sequentially change the control of each applicable actuator to that according to the actuator requirement value according to a predetermined changeover sequence.

12. The control apparatus for the internal combustion engine according to claim 11, wherein: in the changeover sequence, priority of each actuator is established according to torque response sensitivity to changes in the control amount.

13. The control apparatus for the internal combustion engine according to claim 10, wherein: the changeover commanding means commands, when a changeover condition for changing from the control according to the actuator requirement value to the control according to the actuator direct requirement value for all or some of the multiple actuators is met, the changeover means to sequentially change the control of each applicable actuator to that according to the actuator direct requirement value according to a predetermined reverse changeover sequence.

14. The control apparatus for the internal combustion engine according to claim 13, wherein: in the reverse changeover sequence, priority of each actuator is established according to torque control range.

15. The control apparatus for the internal combustion engine according to claim 11, wherein: the changeover commanding means commands the changeover means to change the control of all applicable actuators simultaneously, if a predetermined simultaneous changeover condition is met.

16. The control apparatus for the internal combustion engine according to claim 10, wherein: the changeover means gradually changes, when changing the control of each applicable actuator between that according to the actuator requirement value and that according to the actuator direct requirement value, the value of the control amount to be required of each applicable actuator from the actuator requirement value to the actuator direct requirement value, or from the actuator direct requirement value to the actuator requirement value.

17. The control apparatus for the internal combustion engine according to claim 10, wherein: the actuator requirement value calculating means includes correcting means for correcting, when some of the multiple actuators are controlled according to the actuator direct requirement value, the actuator requirement value of at least one actuator out of actuators not being controlled according to the actuator direct requirement value such that a relationship in control amounts among the multiple actuators does not exceed a combustion limit.

18. The control apparatus for the internal combustion engine according to claim 17, further comprising:

achievement priority decision means for deciding achievement priority of actuator requirement values among the multiple actuators in accordance with the content of the requirement for the performance, wherein: the correcting means corrects the actuator requirement value with low achievement priority based on the actuator direct requirement value and the actuator requirement value with high achievement priority.

19. The control apparatus for the internal combustion engine according to claim 10, wherein: one of the single or multiple predetermined physical quantities is torque and the engine requirement value acquired by the engine requirement value acquiring means includes a torque requirement value;

the multiple actuators include an intake actuator for adjusting an intake air amount and an ignition actuator for adjusting ignition timing;

the engine inverse model includes: means for calculating, based on the torque requirement value, an intake actuator requirement value to be required of the intake actuator; means for estimating, based on the engine information, a torque value to be achieved by an operation of the intake actuator; and means for calculating an ignition actuator requirement value to be required of the ignition actuator so as to compensate for a difference between the torque requirement value and the estimated torque value; and the changeover commanding means commands, when a changeover condition for changing from the control according to the actuator direct requirement value to the control according to the actuator requirement value is met for the intake actuator and the ignition actuator, the changeover means to change the control of the ignition actuator from that according to an ignition actuator direct requirement value to that according to the ignition actuator requirement value; determines, based on a relationship between the ignition actuator requirement value and an adjustable range of the ignition timing, whether or not compensation is feasible for torque deviation as calculated from a current difference between an intake actuator direct requirement value and the intake actuator requirement value through the adjustment of the ignition timing; and commands, if determined that the compensation is not feasible, the changeover means to gradually change the control of the intake actuator from that according to the intake actuator direct requirement value to that according to the intake actuator requirement value.

20. The control apparatus for the internal combustion engine according to claim 19, wherein: the changeover commanding means commands the changeover means to swiftly change the control to that according to the intake actuator requirement value when, in a process of gradually changing the control amount of the intake actuator from the intake actuator direct requirement value to the intake actuator requirement value, the compensation for the torque deviation through the adjustment of the ignition timing becomes feasible.

21. The control apparatus for the internal combustion engine according to claim 19, wherein: the changeover commanding means commands, when a predetermined early changeover condition is met, the changeover means to change the control of the ignition actuator to that according to the ignition actuator requirement value and the control of the intake actuator to that according to the intake actuator requirement value.

22. The control apparatus for the internal combustion engine according to claim 10, wherein: one of the single or multiple predetermined physical quantities is torque and the engine requirement value acquired by the engine requirement value acquiring means includes a torque requirement value;

the multiple actuators include an intake actuator for adjusting an intake air amount and an ignition actuator for adjusting ignition timing;

the engine inverse model includes: means for calculating, based on the torque requirement value, an intake actuator requirement value to be required of the intake actuator; means for estimating, based on the engine information, a torque value to be achieved by an operation of the intake actuator; and means for calculating an ignition actuator requirement value to be required of the ignition actuator so as to compensate for a difference between the torque requirement value and the estimated torque value; and the changeover commanding means commands, when a changeover condition for changing from the control according to the actuator requirement value to the control according to the actuator direct requirement value is met for the intake actuator and the ignition actuator, the changeover means to change the control of the intake actuator from that according to the intake actuator requirement value to that according to an intake actuator direct requirement value; and thereafter commands the changeover means to change the control of the ignition actuator from that according to the ignition actuator requirement value to that according to an ignition actuator direct requirement value.

23. The control apparatus for the internal combustion engine according to claim 22, wherein: the changeover commanding means commands the changeover means to change the control of the ignition actuator from that according to the ignition actuator requirement value to that according to the ignition actuator direct requirement value, when a difference between a value of the control amount actually achieved by the intake actuator and the intake actuator direct requirement value falls within an acceptable range after the control of the intake actuator is changed from that according to the intake actuator requirement value to that according to the intake actuator direct requirement value.

24. The control apparatus for the internal combustion engine according to claim 22, wherein: the changeover commanding means commands, when a predetermined early changeover condition is met, the changeover means to change the control of the intake actuator to that according to the intake actuator requirement value and the control of the ignition actuator to that according to the ignition actuator requirement value.

25. A control apparatus for an internal combustion engine whose operation is controlled by multiple actuators, the control apparatus comprising:

an engine requirement value acquiring unit configured to acquire a single or multiple requirement values representing a single or multiple predetermined physical quantities (hereinafter referred to as an "engine requirement value") that determine an operation of the internal combustion engine;

an engine information acquiring unit configured to acquire information on a current operating state or operating condition of the internal combustion engine (hereinafter referred to as "engine information");

an actuator requirement value calculating unit including an engine inverse model configured to model, with physical models or statistical models using the engine information as a parameter, the relation between a control amount of each of the multiple actuators and each value representing a corresponding one of the single or multiple predetermined physical quantities achieved in the internal combustion engine, the actuator requirement value calculating unit calculating comprehensively a control amount to be required of each of the multiple actuators (hereinafter referred to as an "actuator requirement value") by inputting each engine requirement value and the engine information to the engine inverse model;

an actuator requirement value generating unit which is configured to generate, individually for each of the multiple actuators, based on an engine requirement value associated with a control amount of an assigned actuator, a control amount to be required of the assigned actuator (hereinafter referred to as an "actuator direct requirement value") independently of each other; and a changeover unit configured to change control of the multiple actuators between that according to the actuator requirement value and that according to the actuator direct requirement value.

* * * * *